(12) United States Patent
Green et al.

(10) Patent No.: US 11,207,629 B2
(45) Date of Patent: Dec. 28, 2021

(54) EASILY SHIPPED AND INSTALLED FILTER AND FILTER HOUSE

(71) Applicants: Thomas B. Green, College Grove, TN (US); Jason LaMarr Tate, Thompsons Station, TN (US); Leonard R. Castellano, Franklin, TN (US); Stephen David Hiner, Salisbury (GB); Ryan Margate Pastrana, Franklin, TN (US)

(72) Inventors: Thomas B. Green, College Grove, TN (US); Jason LaMarr Tate, Thompsons Station, TN (US); Leonard R. Castellano, Franklin, TN (US); Stephen David Hiner, Salisbury (GB); Ryan Margate Pastrana, Franklin, TN (US)

(73) Assignee: Parker-Hannifin Corporation, Cleveland, OH (US)

(*) Notice: Subject to any disclaimer, the term of this patent is extended or adjusted under 35 U.S.C. 154(b) by 294 days.

(21) Appl. No.: 16/381,583

(22) Filed: Apr. 11, 2019

(65) Prior Publication Data
US 2019/0314748 A1 Oct. 17, 2019

Related U.S. Application Data

(60) Provisional application No. 62/656,124, filed on Apr. 11, 2018.

(51) Int. Cl.
*B01D 46/00* (2006.01)
*B01D 46/52* (2006.01)
(Continued)

(52) U.S. Cl.
CPC ......... *B01D 46/0005* (2013.01); *B01D 35/30* (2013.01); *B01D 46/0023* (2013.01);
(Continued)

(58) Field of Classification Search
CPC ............ B01D 46/0005; B01D 46/0002; B01D 46/0023; B01D 46/521; B01D 46/125; B01D 35/30; B01D 46/008; B01D 41/04
See application file for complete search history.

(56) References Cited

U.S. PATENT DOCUMENTS

| 5,223,008 A | 6/1993 | Troxell |
| 7,511,960 B2 * | 3/2009 | Hillis ........................ G06F 1/20 165/80.4 |

(Continued)

FOREIGN PATENT DOCUMENTS

| WO | WO 2017/031168 A1 | 2/2017 |
| WO | WO 2017/139268 A1 | 8/2017 |

*Primary Examiner* — Dung H Bui
(74) *Attorney, Agent, or Firm* — Reinhart Boerner Van Deuren P.C.

(57) ABSTRACT

Filter systems, filters, and methods of managing filter systems are provided. The filter systems utilize large filters that are too large to be manually handled by service personnel. As such, the filter systems and methods utilize filter positioning units for handling the filters during maintenance intervals. Some systems include sensor for remotely monitoring the status of the filters and the information can be used to reverse pulse the filters as well as to indicate the end of the service life of the filters. The filters can be refurbished with new filter media.

21 Claims, 15 Drawing Sheets

(51) Int. Cl.
B01D 46/12 (2006.01)
B01D 35/30 (2006.01)
B01D 41/04 (2006.01)

(52) U.S. Cl.
CPC ......... B01D 46/125 (2013.01); B01D 46/521 (2013.01); *B01D 41/04* (2013.01); *B01D 46/0002* (2013.01)

(56) References Cited

U.S. PATENT DOCUMENTS

| | | | |
|---|---|---|---|
| 8,460,443 | B2 | 6/2013 | Seitz |
| 8,580,014 | B1 | 11/2013 | Pike et al. |
| 9,028,578 | B2 * | 5/2015 | Chin .................... B01D 46/125 55/483 |
| 2003/0155289 | A1 | 8/2003 | Barnhart et al. |
| 2006/0136237 | A1 * | 6/2006 | Spiegel ................ G06Q 10/083 705/330 |
| 2009/0158697 | A1 * | 6/2009 | Magee ............... B01D 46/0002 55/492 |
| 2009/0249755 | A1 * | 10/2009 | O'Leary ............. B01D 46/523 55/492 |
| 2011/0048228 | A1 * | 3/2011 | Handley ............. B01D 46/125 95/45 |
| 2011/0252759 | A1 * | 10/2011 | Nicholas ............. B01D 46/125 55/497 |
| 2012/0272632 | A1 * | 11/2012 | Lans ...................... B01D 46/12 55/478 |
| 2013/0255359 | A1 | 10/2013 | Smith et al. |
| 2014/0082910 | A1 * | 3/2014 | Sullivan ................ G06Q 30/06 29/402.01 |
| 2014/0298764 | A1 * | 10/2014 | Haufe .................... B01D 46/10 55/501 |
| 2014/0366798 | A1 * | 12/2014 | Katefidis ............ B01D 46/0019 118/326 |
| 2015/0034535 | A1 * | 2/2015 | Lough ..................... C02F 9/005 210/85 |
| 2015/0082988 | A1 * | 3/2015 | Butler ................ B01D 46/0086 96/226 |
| 2015/0166385 | A1 * | 6/2015 | Boerm .................. B01D 61/08 210/652 |
| 2015/0367372 | A1 * | 12/2015 | Roeckle ............. B01D 46/0002 55/495 |
| 2016/0067644 | A1 * | 3/2016 | Scaife ................... G06Q 10/08 95/273 |
| 2016/0288036 | A1 * | 10/2016 | Wieland ............... B01D 46/002 |
| 2017/0182450 | A1 * | 6/2017 | Kitaguchi .......... B01D 46/4227 |
| 2017/0326480 | A1 * | 11/2017 | Day ..................... C02F 11/128 |
| 2018/0036709 | A1 * | 2/2018 | Henson ..................... C01B 3/34 |
| 2018/0111075 | A1 * | 4/2018 | Katare ............... B01D 46/0016 |
| 2019/0308121 | A1 * | 10/2019 | Gupta ................ H05K 7/20736 |
| 2020/0215473 | A1 * | 7/2020 | Remschak ............ D01H 11/00 |

* cited by examiner

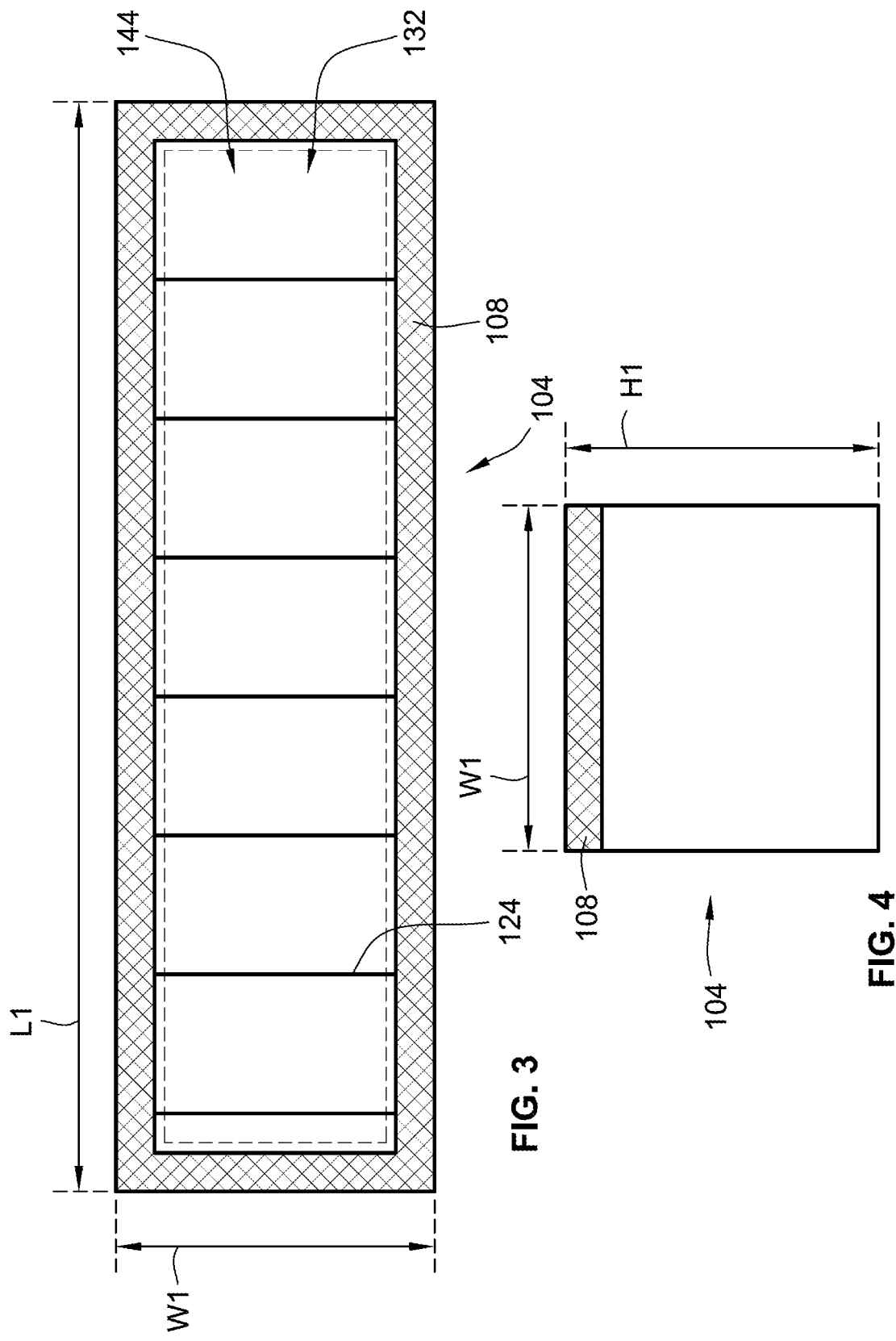

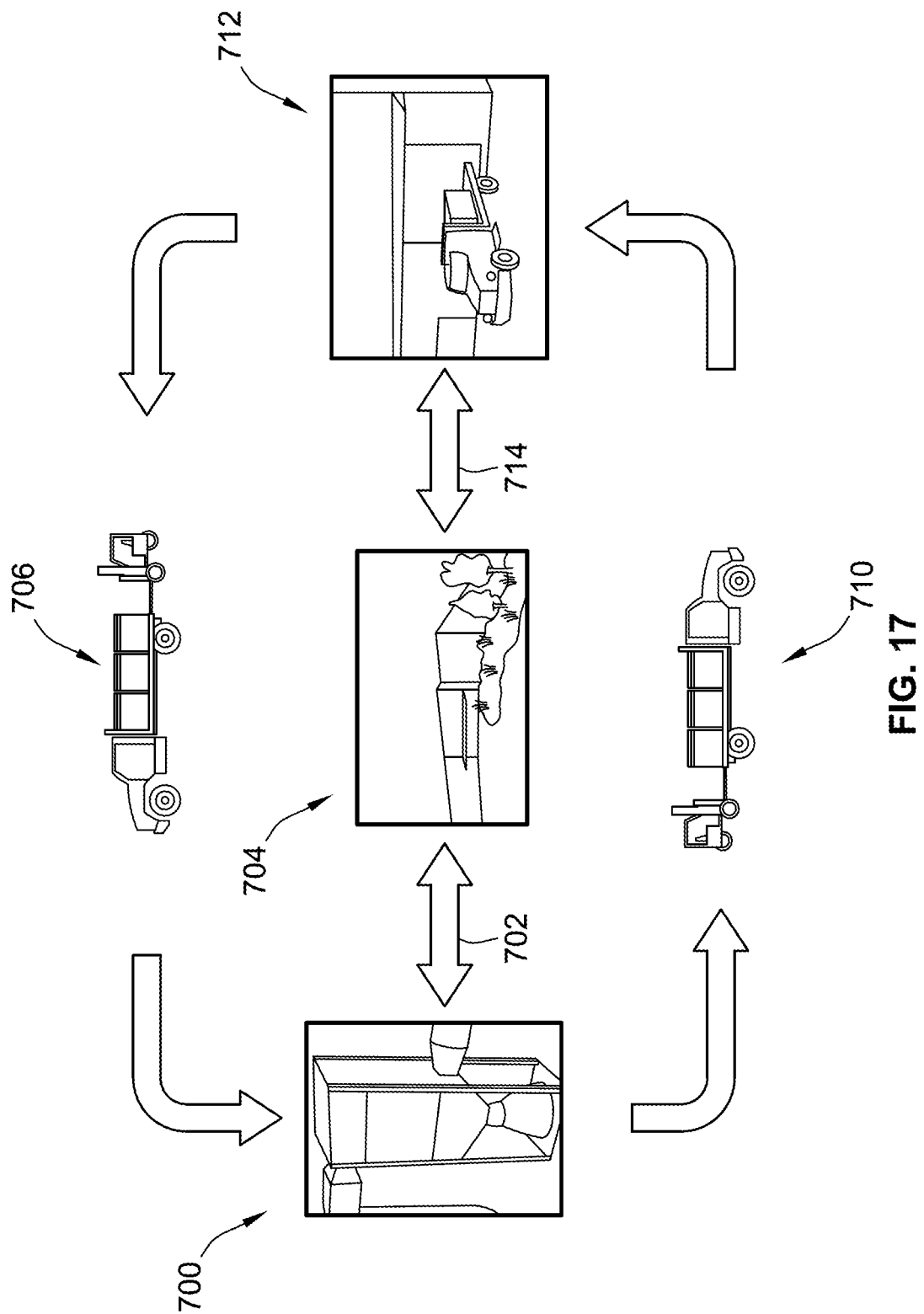

EASILY SHIPPED AND INSTALLED FILTER AND FILTER HOUSE

CROSS-REFERENCE TO RELATED PATENT APPLICATIONS

This patent application claims the benefit of U.S. Provisional Patent Application No. 62/656,124, filed Apr. 11, 2018, the entire teachings and disclosure of which are incorporated herein by reference thereto.

FIELD OF THE INVENTION

This invention generally relates to filters and filter systems for filtering air.

BACKGROUND OF THE INVENTION

Filter systems are used to filter fluids such as air as the fluid flows through a filter media. Some filter systems are used to supply large volumes of fluid to downstream systems such as for use in supplying air to gas turbines.

Prior filter system will typically include a plurality of filters that are mounted within a filter house. The filters will remove impurities from the fluid. Typically, the filters are replaceable and removable from the filter house when they are spent. The filters and filter house are sized such that a service technician can easily manipulate and handle the filters during installation and servicing.

Filter houses hold varying numbers, sizes and types of filters. Typically, the larger the filter house, the more filters that are installed therein. This causes a number of technical and commercial challenges, such as for example, shipping of a large number of filters, installation time for installing a large number of filters, the number of service technicians required to install or service the large number of filters, the amount of design and manufacturing time required for different sized filter houses and installation time of the filter houses. Further, the filter houses are often required to be sized to provide access for not only the filters themselves but for the service technician to have access to the filters to install and service the filters within the filter house.

Further, monitoring and scheduling filter maintenance can be time consuming, costly and difficult when using small filters.

The present invention provides improvements over the current state of the art as it relates to filters and filter systems and particularly filters and filter systems for use with high flow/high volume downstream systems such as for example gas turbines.

BRIEF SUMMARY OF THE INVENTION

New and improved filter systems, filters, methods of filter air and methods of distributing filters are provided.

In one embodiment, a method of filtering air to be supplied to a gas turbine is provided. The method includes providing a filter house module defining a filter mounting interface. The method includes mounting a filter to the filter mounting interface by conveying the filter from an unmounted position into a mounting position adjacent to the filter mounting interface using a filter positioning unit that supports and conveys the filter.

In one embodiment, conveying the filter is performed with a conveyor of the filter positioning unit. The conveyor has a delivery region and a mounting region. The delivery region is spaced away from the filter house module where the filter can be placed on the conveyor. The mounting region is located adjacent the filter mounting interface where the filter is attached to the filter mounting interface. In some embodiments, spent filters can be removed from the conveyor at the delivery region as well.

In one embodiment, the method includes transitioning the filter into engagement with the filter mounting interface when the conveyor conveys the filter from the delivery region to the mounting region.

In one embodiment, the method includes transitioning the filter out of engagement with the filter mounting interface when the conveyor conveys the filter from the mounting region to the delivery region.

In one embodiment, the conveyor includes a removal region opposite the delivery region where spent filters are removed from the conveyor after being removed from the filter house module.

In one embodiment, the filter positioning unit is a mechanical lift and the step of conveying includes raising the filter from the unmounted position to the mounted position such that the filter engages the filter mounting interface.

In one embodiment, the mechanical lift forms part of a trailer used to transport the filter proximate the filter house module. The step of conveying the filter from the unmounted position to the mounted position occurs by directly conveying the filter from the trailer to the filter mounting interface using the mechanical lift.

In one embodiment, the filter house module defines at least two filter mounting interfaces such that at least two filters can be mounted to the filter house module. The method further includes isolating a first one of the filter mounting interfaces by preventing air flow therethrough while continuing to permit air flow through the first filter mounting interface. The method includes removing a spent filter from the isolated filter mounting interface using the filter positioning unit. The method includes installing a clean filter to the isolated filter mounting interface by transitioning the clean filter from an unmounted position to a mounted position adjacent the isolated filter mounting interface. The method includes un-isolating the first one of the filter mounting interfaces and allowing air to flow through the clean filter and the first one of the filter mounting interfaces.

In one embodiment, the steps of removing and installing occur while the other one of the filter mounting interfaces is un-isolated and allows air flow therethrough such that air is being supplied to downstream components while the filter attached to the first one of the filter mounting interfaces is being serviced.

In another embodiment, a method of distributing a filter for use with a filter house module of a gas turbine is provided. The method includes shipping a filter to a site having a filter house module. The filter includes a frame and filter media secured to the frame. The frame is formed at least in part by a shipping container for shipping the filter. The method includes mounting the filter to the filter house module with at least a portion of the shipping container remaining attached to the filter media and mounted to the filter house module.

In one embodiment, the method includes removing the filter from the filter house module; shipping, at least the frame, offsite; removing spent filter media from the frame, either on site or offsite; replacing the filter media with new filter media to form a refurbished filter; and using the refurbished filter to filter air.

In one embodiment, a filter system including a filter house module, a filter and a filter positioning unit is provided. A filter system finds particular use for a gas turbine. The filter house module defines a filter mounting interface. The filter includes a filter house interface that mates with the filter mounting interface. The filter positioning unit is configured to transition the filter into a mounting position adjacent with the filter house interface adjacent the filter mounting interface to attach the filter to the filter house module.

In one embodiment, the filter positioning unit includes a conveyor that has a delivery region and a mounting region. The delivery region is spaced away from the filter house module where a filter can be placed on the conveyor. The mounting region is located adjacent the filter mounting interface where the filter can be attached to the filter mounting interface.

In one embodiment, the filter positioning unit transitions the filter into engagement with the filter mounting interface when the conveyor transitions the filter from the delivery region to the mounting region.

In one embodiment, the filter position unit transitions the filter out of engagement with the filter mounting interface when the conveyor transitions the filter from the mounting region to a removal region.

In one embodiment, the filter positioning unit includes a mechanical lift that raises the filter from an unmounted position to a mounted position wherein the filter is engagement with the filter mounting interface.

In one embodiment, the mechanical lift forms part of a trailer used to deliver the filter. The mechanical lift is configured to lift the filter directly from the trailer into engagement with the filter mounting interface.

In one embodiment, the filter includes a frame defining, at least in part, the filter house interface configured to mate with the filter mounting interface. The frame forms part of a shipping container used to ship the filter from a remote location to a site where the filter house module is located. The filter includes filter media operably attached to the frame to prevent fluid from bypassing the filter media.

In one embodiment, the frame defines an air inlet upstream of the filter media and the filter house interface. The air inlet forms one of the sides of the shipping container.

In one embodiment, a cover covers the air inlet during shipment of the filter and the cover is moved to expose the filter house interface when the filter is mounted to the filter mounting interface.

In one embodiment, the cover is a pair of doors on an end of the shipping container.

In one embodiment, the cover is in the form of a flexible material.

In one embodiment, the filter weighs at least 50 lbs in a clean state.

In one embodiment, filter house module is a hub arrangement including a plurality of filter mounting interfaces fluidly communicating with a clean air volume. The system includes a plurality of filters. Each filter includes a filter house interface that mates with a corresponding one of the filter mounting interfaces. The filter positioning unit transitions the filters into a corresponding mounting position with the corresponding filter house interface adjacent the corresponding filter mounting interface to attach the filters to the filter house module.

In one embodiment, the filter positioning unit includes a plurality of conveyors. Each filter mounting interface has a corresponding one of the plurality of conveyors associated therewith to convey a corresponding filter to and away from the filter mounting interface.

In one embodiment, at least one isolation unit is positioned downstream from at least one of the filter mounting interfaces and is transitionable between a blocking position in which the isolation unit prevents air flow through the corresponding filter mounting interface and an open position that allows for air flow through the corresponding filter mounting interface. When the isolation unit is in the blocking position, the filter mounted to the corresponding filter mounting interface can be removed but air is permitted to flow through at least one other filter mounting interface to continue to allow filtered air to flow through the filter house module.

In one embodiment, the filter mounting interface and filter house interface have first and second lateral dimensions that are perpendicular to one another as well as perpendicular to the flow of air through the filter mounting interface and filter house interface. Each of the first and second lateral dimensions is at least 5 feet.

In one embodiment, the shipping container generally defines a first pair of spaced apart and parallel rectangular sides with each side having dimensions of at least five feet by five feet. The shipping container includes a second pair of spaced apart and parallel rectangular sides with each side having dimensions of at least five feet by 15 feet. The second pair of spaced apart and parallel rectangular sides extends perpendicularly between the first pair of spaced apart and parallel rectangular sides. The shipping container includes a third pair of spaced apart and parallel rectangular sides with each side having dimensions of at least five feet by 15 feet. The third pair of spaced apart and parallel rectangular sides extends perpendicularly between the first pair of spaced apart and parallel rectangular sides and extends perpendicularly between the second pair of spaced apart and parallel rectangular sides.

In one embodiment, the filter house interface is provided by a first one of the sides.

In one embodiment, a dirty fluid inlet upstream of the filter media and the filter house interface is formed in a different one of the sides.

In one embodiment, the shipping container defines an interior cavity having a cavity volume that holds the filter media. The filter media defines a theoretical three-dimensional outer periphery that bounds a theoretical volume. The theoretical volume is at least 75 percent of the cavity volume.

In one embodiment, the filter media has at least 800 square feet of filter media and more preferably at least 950 square feet of filter media. In one embodiment, the shipping container is approximately twenty feet long with one pleat per foot of length. Each pleat has two pleat panels. Further, each pleat panel may be at least three feet wide and eight feet high. Such an embodiment would have approximately 960 square feet of filter media. However, in alternative embodiments, the amount of filter media can be greater than this.

In one embodiment, the filter media remains in a constant position relative to the frame defined by the shipping container when the filter is shipped as well as after the filter is mounted to the filter house module and is in use.

In one embodiment, the filter house module defines a clean air volume downstream of the filter mounting interface. The clean air volume has a depth that is generally parallel to a flow of clean air through the filter mounting interface. The filter has a dimension parallel to the depth of the clean air volume when mounted to the filter house module. The dimension of the filter being less than the depth of the clean air volume.

In one embodiment, the filter house module is formed as a shipping container.

In one embodiment, the system includes an evaporative cooling module downstream of the filter house module. The evaporative cooling module is formed as a shipping container and is operably fluidly couplable with the filter house module.

In one embodiment, the filter house module includes a pulse cleaning system for pulsing the filter in a flow direction opposite the direction through which the air passes the filter to filter the air.

In one embodiment, a filter for use with a filter house module for a gas turbine defining a filter mounting interface is provided. The filter includes a frame and filter media. The frame defines a filter house interface configured to mate with the filter mounting interface. The frame forms part of a shipping container used to ship the filter. The filter media is operably attached to the frame to prevent fluid from bypassing the filter media.

In one embodiment, the frame defines an air inlet upstream of the filter media and upstream of the filter house interface. The air inlet forming one of the sides of the shipping container.

In one embodiment, a cover covers the air inlet during shipment of the filter and the cover is moved to expose the filter house interface when the filter is to be mounted to the filter mounting interface. A cover may also be provided that covers the air outlet during shipment. The cover covering the air outlet is also moved when the filter is mounted to the filter mounting interface.

In one embodiment, the filter weighs at least 50 lbs in a clean state.

In one embodiment, the filter house interface has first and second lateral dimensions that are perpendicular to one another as well as perpendicular to the flow of air through the filter house interface. Each of the first and second lateral dimensions are at least 5 feet.

In one embodiment, the shipping container generally defines a first pair of spaced apart and parallel rectangular sides with each side having dimensions of at least five feet by five feet. The shipping container includes a second pair of spaced apart and parallel rectangular sides with each side having dimensions of at least five feet by 15 feet. The second pair of spaced apart and parallel rectangular sides extends perpendicularly between the first pair of spaced apart and parallel rectangular sides. The shipping container includes a third pair of spaced apart and parallel rectangular sides with each side having dimensions of at least five feet by 15 feet. The third pair of spaced apart and parallel rectangular sides extends perpendicularly between the first pair of spaced apart and parallel rectangular sides and extends perpendicularly between the second pair of spaced apart and parallel rectangular sides.

In one embodiment, the filter house interface is provided proximate a first one of the sides.

In one embodiment, a dirty fluid inlet upstream of the filter media and the filter house interface is formed in a different one of the sides.

In one embodiment, the shipping container defines an interior cavity having a cavity volume that holds the filter media. The filter media defines a theoretical three-dimensional outer periphery that bounds a theoretical volume. The theoretical volume is at least 75 percent of the cavity volume.

In one embodiment, the filter media has at least 800 square feet of filter media and more preferably at least 950 square feet of filter media. In one embodiment, the shipping container is approximately twenty feet long with one pleat per foot of length. Each pleat has two pleat panels. Further, each pleat panel may be at least three feet wide and eight feet high. Such an embodiment would have approximately 960 square feet of filter media.

In one embodiment, the filter media remains in a constant position relative to the frame defined by the shipping container when the filter is shipped as well as after the filter is mounted to the filter house module and is in use.

In one embodiment, the filter media is provided by a plurality of filter media packs. Each filter media pack is provided by a sheet of filter media folded to form a plurality of interconnected pleat panels. The filter media pack has first and second dimensions that are generally perpendicular to one another and generally perpendicular to a flow of air through the filter media pack. The first dimension being at least 85% of the width of the shipping container and at least 85% of a height of the shipping container.

In one embodiment, the filter media includes a sheet of filter media that is mounted within the frame in a zig-zag shape forming a plurality of folds and a plurality of panels. The panels extending between the folds. Each panel has first and second dimensions extending generally perpendicular to one another and perpendicular to air flow through the panel. The first dimension being at least 85% of the width of the shipping container and at least 85% of a height of the shipping container.

In one embodiment, the shipping container includes a plurality of sides that define a dirty fluid inlet. The sides protect the filter media during shipment of the filter.

In one embodiment, the filter media is replaceable such that the frame is reusable. In a preferred embodiment, the replaceable portion is entirely incinerable.

In another embodiment, a filter for use with a filter house module for a gas turbine is provided. The filter house module defines a filter mounting interface. The filter includes a frame defining a filter house interface configured to mate with the mounting interface. The filter includes filter media operably attached to the frame to prevent fluid from bypassing the filter media.

In one embodiment, the filter media has at least 800 square feet of filter media and more preferably at least 950 square feet of filter media. In one embodiment, the shipping container is approximately twenty feet long with one pleat per foot of length. Each pleat has two pleat panels. Further, each pleat panel may be at least three feet wide and eight feet high. Such an embodiment would have approximately 960 square feet of filter media.

In an embodiment, a method of distributing a filter for use with a filter house module is provided. The method includes shipping a filter to a site having a filter house module. The filter comprises a frame and filter media secured to the frame. The frame is formed at least in part by a shipping container for shipping the filter. The method includes mounting the filter to the filter house module with at least a portion of the shipping container remaining attached to the filter media and mounted to the filter house module.

In one embodiment, the method includes. Removing the filter from the filter house module. The method includes shipping, at least the frame, to a reconditioning facility. The method includes removing spent filter media from the frame. The method includes replacing the filter media with new filter media to form a refurbished filter. The method includes using the refurbished filter to filter air.

In one embodiment, the method includes monitoring the filter while in use in the filter house module. The method includes determining that the filter needs to be replaced. The method includes communicating the need to replace the filter to service personnel. The method includes dispatching service personnel with a replacement filter. The method includes replacing the filter with the replacement filter.

In one embodiment, the method includes analyzing the filter at the reconditioning facility.

In one embodiment, the step of communicating the need to replace the filter sends information to a central service center. The central service center dispatches the service personnel with the replacement filter.

In one embodiment, the method includes communicating information relating to the filter during the step of analyzing to the central service center.

In one embodiment, the step of communicating the need to replace the filter sends information to a central service center. The central service center dispatches the service personnel with the replacement filter.

In one embodiment, the step of analyzing the filter at the reconditioning facility occurs prior to removing spent filter media from the frame In one embodiment, the step of analyzing the filter at the reconditioning facility occurs after removing spent filter media from the frame In one embodiment, the replacement filter is dispatched with at least one cover covering at least one opening in the replacement filter. The method includes attaching the cover to the frame of the filter that is replaced by the replacement filter prior to shipping, at least the frame, to the reconditioning facility.

In one embodiment, the method includes monitoring the filter while in use in the filter house module. The method includes determining that the filter needs to be replaced. The method includes communicating the need to replace the filter to service personnel. The method includes dispatching service personnel with a replacement filter. The method includes replacing the filter with the replacement filter.

In one embodiment, replacing the filter with the replacement filter uses a filter positioning unit such that the filter and replacement filter need not be manually handled by the service personnel.

In one embodiment, the filter house module has a plurality of filters mounted thereto. The method further includes isolating the filter being replaced such that no air passes through the filter being replaced but continuing to allow air to pass through at least one of the other filters such that the filter house module still has clean air passing therethrough while the filter is being replaced.

In one embodiment, the filter has a width of at least three feet, a height of at least three feet and a length of at least three feet and has a weight of 150 kg.

In one embodiment, the method includes transporting the filter from a transportation device to the filter house module with a filter positioning unit.

In one embodiment, the filter positioning unit is a forklift and the transportation device is a trailer.

In one embodiment, the shipping container is an intermodal shipping container.

In one embodiment, the filter positioning unit is transported with the replacement filter.

In one embodiment, the replacement filter is a refurbished filter that had been previously in service.

In one embodiment, the method includes forming the replacement filter includes refurbishing a previously used filter to form the replacement filter.

In one embodiment, the step of refurbishing includes reusing a frame member of the previously used filter and installing new filter media within the reused frame member.

In one embodiment, the method includes replacing the filter with a replacement filter at a predetermined service interval regardless of the life status of the filter.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 3 is a simplified top view illustration of the filter of FIG. 2;

FIG. 4 is a simplified end view of the filter of FIG. 2;

FIG. 17 is a schematic chart illustrating a filter management system.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
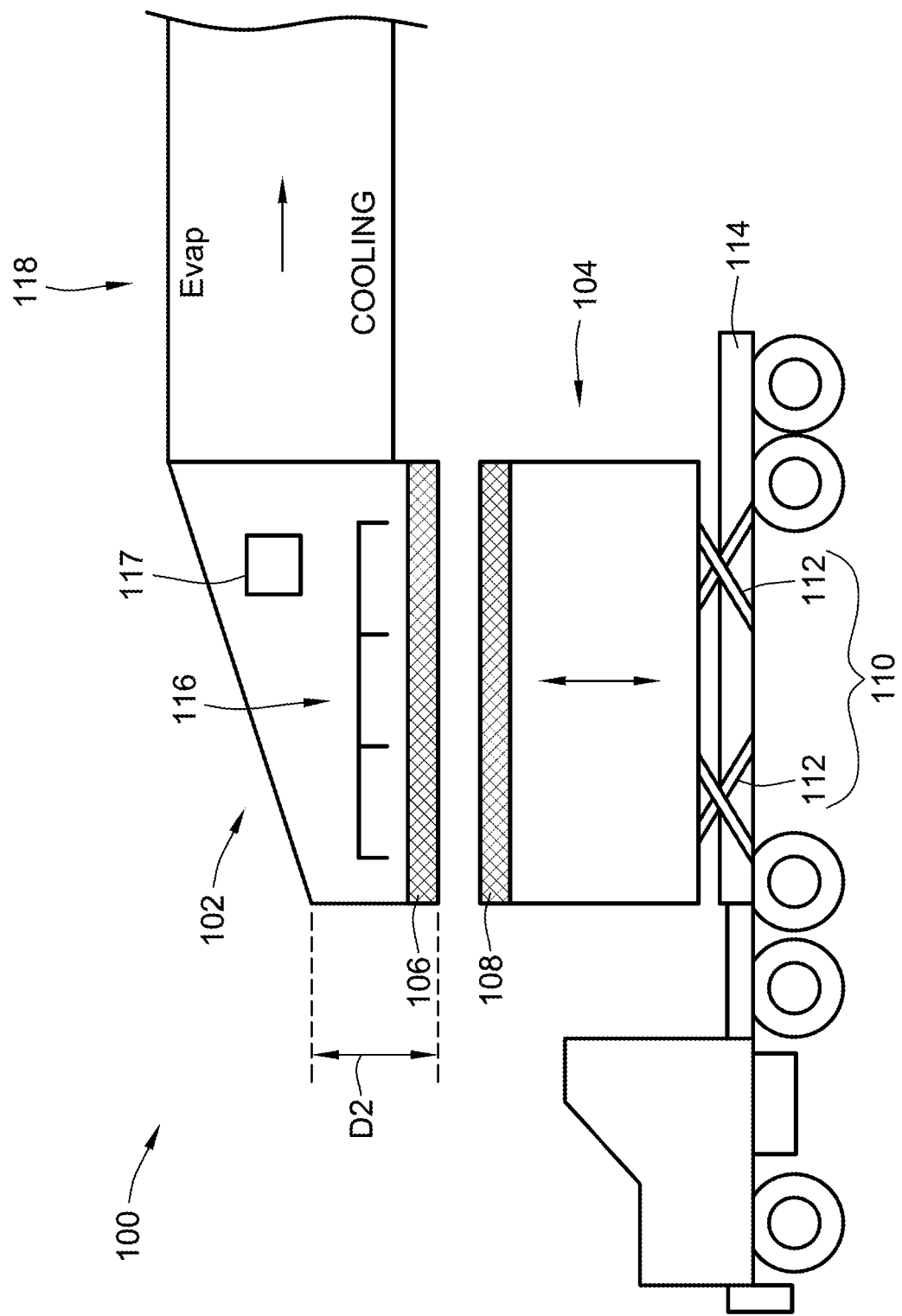
FIG. 1 is a schematic illustration of a first embodiment of a filter system for filtering air.

FIG. 1 illustrates a first embodiment of a filter system 100 for filtering air. The filter system 100 finds particular usefulness as a filter system for filtering air supplied to a gas turbine. Gas turbines use a large volume of air. Here, a gas turbine may have an approximate air flow range of about 50 Lb/sec to about 2000 Lb/sec in which the airflow proceeds toward the gas turbine at a range of approximate velocities of about 300 ft/min (91 meters/min) to about 3,000 ft/min (914 meters/min). However, greater air flows are contemplated. The filter system 100 includes an inlet duct system along which the airflow travels toward elements of the gas turbine, such as the turbine, the compressor and the combustor, to provide for a supply of coolant and combustible air to the gas turbine which is significantly free of particles in a solid state (i.e., dry particles) and aqueous solutions that could lead to an accumulation of corrosive deposits on those elements.

The filter system 100 in the illustrated embodiment includes a filter house module 102, forming part of the inlet duct system, and a filter 104 (also referred to as filter unit 104) removably attachable to the filter house module 102 for filtering air that passes through the filer system 100. In FIG. 1, the filter 104 has not been attached to the filter house module 102.

Unlike prior art filters of filter systems where a filter house will have a tube sheet to which a plurality of filters that are manually manipulated by a service technician are mounted, filter 104 is a significantly larger filter such that significantly fewer filters are needed. In some embodiments, only a single filter 104 is provided that provides sufficient flow capacities to meet the demands of the gas turbine. In some embodiments, each filter 104 will allow for a flow rate of at least 90 LB/sec of air flow at a range of approximate velocities of about 150 ft/min to about 300 ft/min. By increasing the size of the filter 104, shipping, handling, filter change out efficiency and volume of filter media can be optimized as compared to using many smaller filters. Further, it can eliminate the risk of injury to the service personnel as no manual lifting is required.

The filter house module 102 defines a filter mounting interface 106, illustrated schematically, to which a filter house interface 108 of the filter 104 will sealingly mate. The two interfaces 106, 108 may have cooperating sealing structures to prevent dirty fluid from bypassing filter 104. One interface may slide axially into the other interface or the interfaces may 106, 108 may have axially abutting surfaces that form a sealing relationship therebetween. Gaskets may be provided to seal the filter house module 102 to the filter 104. Additionally, mechanical couplings such as latches, buckles, hooks, clips, bolts, tongue-and-groove arrangements, etc. may be provided to mechanically secure the filter 104 to the filter house module 102.

The filter system 100 may also include a filter positioning unit 110 configured to transition the filter 104 into a mounting position where the filter house interface 108 is adjacent the filter mounting interface 106. When in the mounting position, the filter 104 can be attached or maintained in fluid communication with the filter house module 102.

Figure 12:
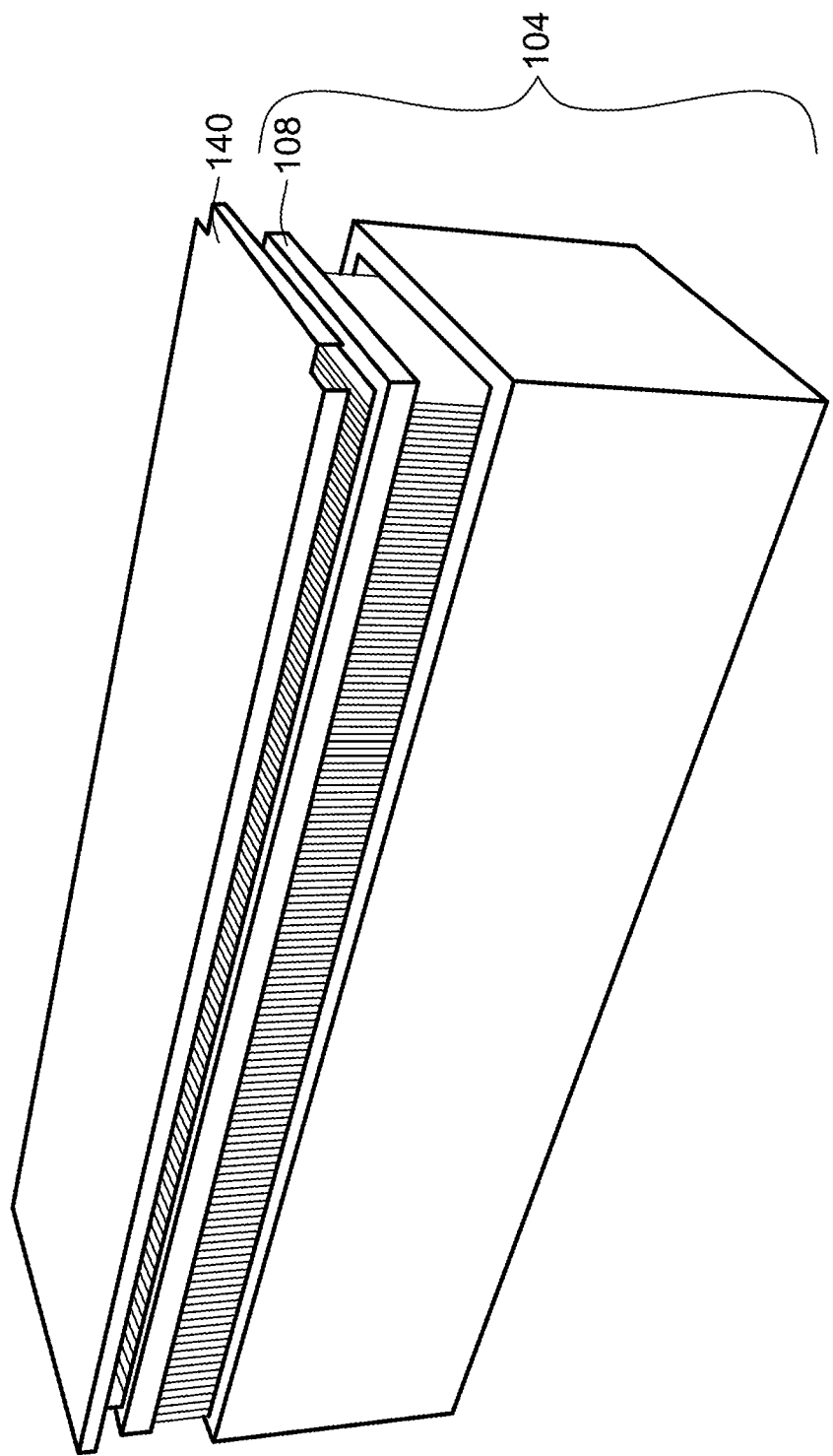
FIG. 12 is a more detailed illustration of a filter used in the filter systems described herein in exploded form.
Figure 13:
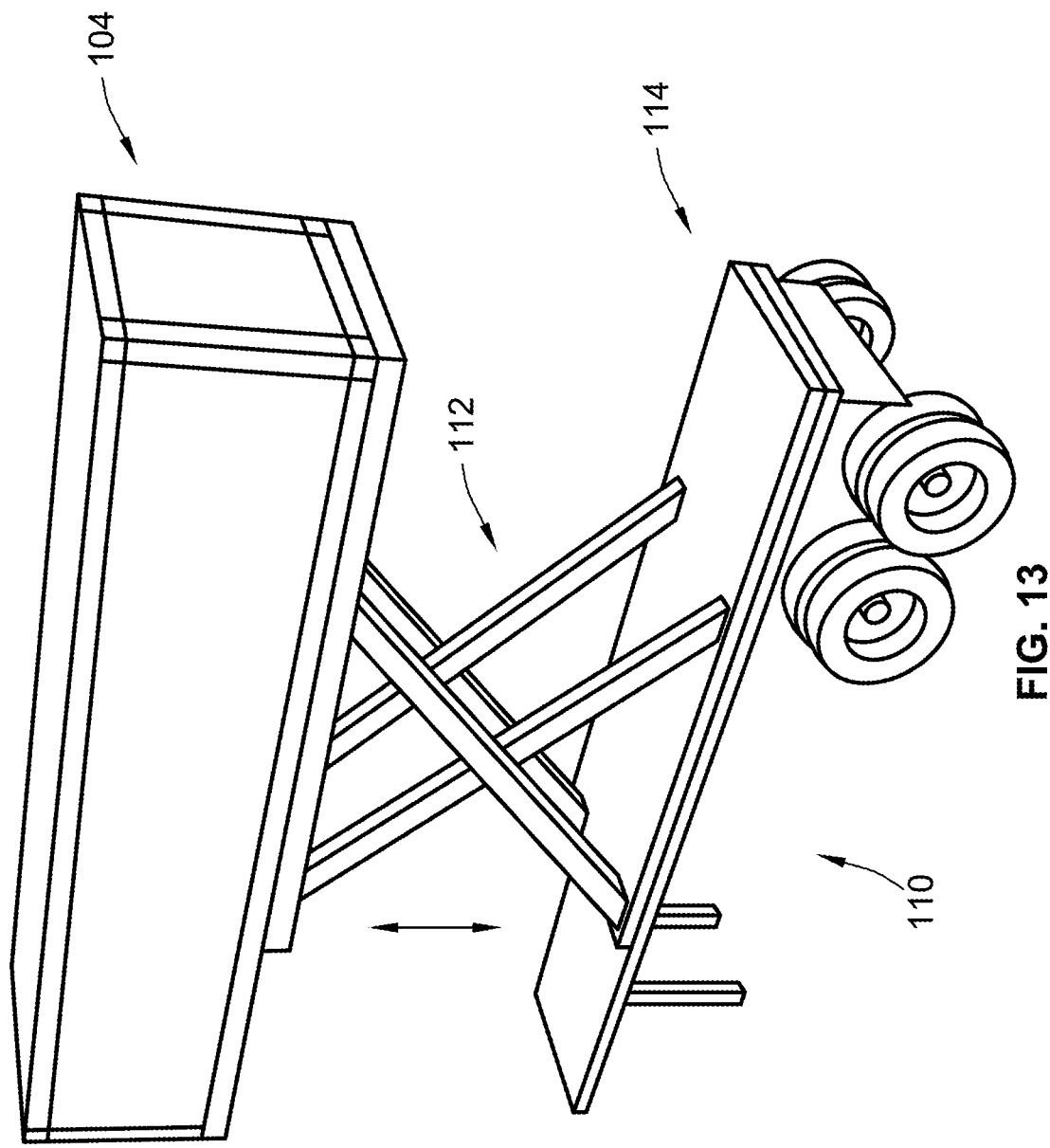
FIG. 13 is a more detailed illustration of the filter of FIG. 12 on a trailer that includes a filter positioning unit.

In the embodiment of FIG. 1 and with additional reference to more detailed images in FIGS. 12 and 13, the filter positioning unit 110 includes a mechanical lift 112 that raises the filter 104 from an unmounted position to a mounted position wherein the filter mounting interface 106 is in engagement with the filter house interface 108. In this embodiment, the mechanical lift 112 forms part of a trailer 114 used to deliver the filter 104. The mechanical lift 112 lifts the filter 104 directly from the trailer 114 into engagement with the filter house module 102 and holds the filter in the mounting position until filter 104 is secured to the filter house module 102. Once the filter 104 is installed, the trailer 114 and filter positioning unit 110 can be removed.

With continued reference to FIG. 1, this particular filter system 100 includes a pulse cleaning system 116 that generates air pulses to clean the filter 104 to extend the serviceable life of the filter 104 and reduce the need for replacement of the filter 104. Typically, the pulse cleaning system 116 will flow air in a reverse direction through the filter 104 as opposed to the direction air flows during normal filtering operations.

A sensor 117 can be used to monitor the life of the filter 104 and determine when to initiate pulse cleaning. While one sensor 117 is illustrated in schematic form, multiple sensors 117 could be implemented. Sensor(s) 117 could be a pressure sensor or could measure the speed of the air exiting the filter 104. The sensor(s) 117 could measure an overall average state of the filter, e.g. be positioned sufficiently downstream that the entire air stream is being analyzed or could be positioned sufficiently close to the filter 104 and media thereof that localized portions of the filter media are being monitored. As will be discussed more fully below, sensor 117 could also be used to communicate information to service personnel to dispatch the service personnel with replacement filters when the filter 104 in use is spent and pulse cleaning is no longer adequate. Sensor 117 could, thus, be in communication with a central service center as will be discussed below.

An evaporative cooling unit 118 is in fluid communication with the filter house module 102. Evaporative cooling unit 118 is optional and may be used in hotter climates to increase air density, and therefore, mass airflow to the gas turbine. The evaporative cooling unit 118 will cooperate with a clean air volume 120 of the filter house module 102. In preferred embodiments, the filter house module 102 and the evaporative cooling unit 118 are both formed as part of a shipping container for easy transportation of these units to remote locations.

Figure 2:
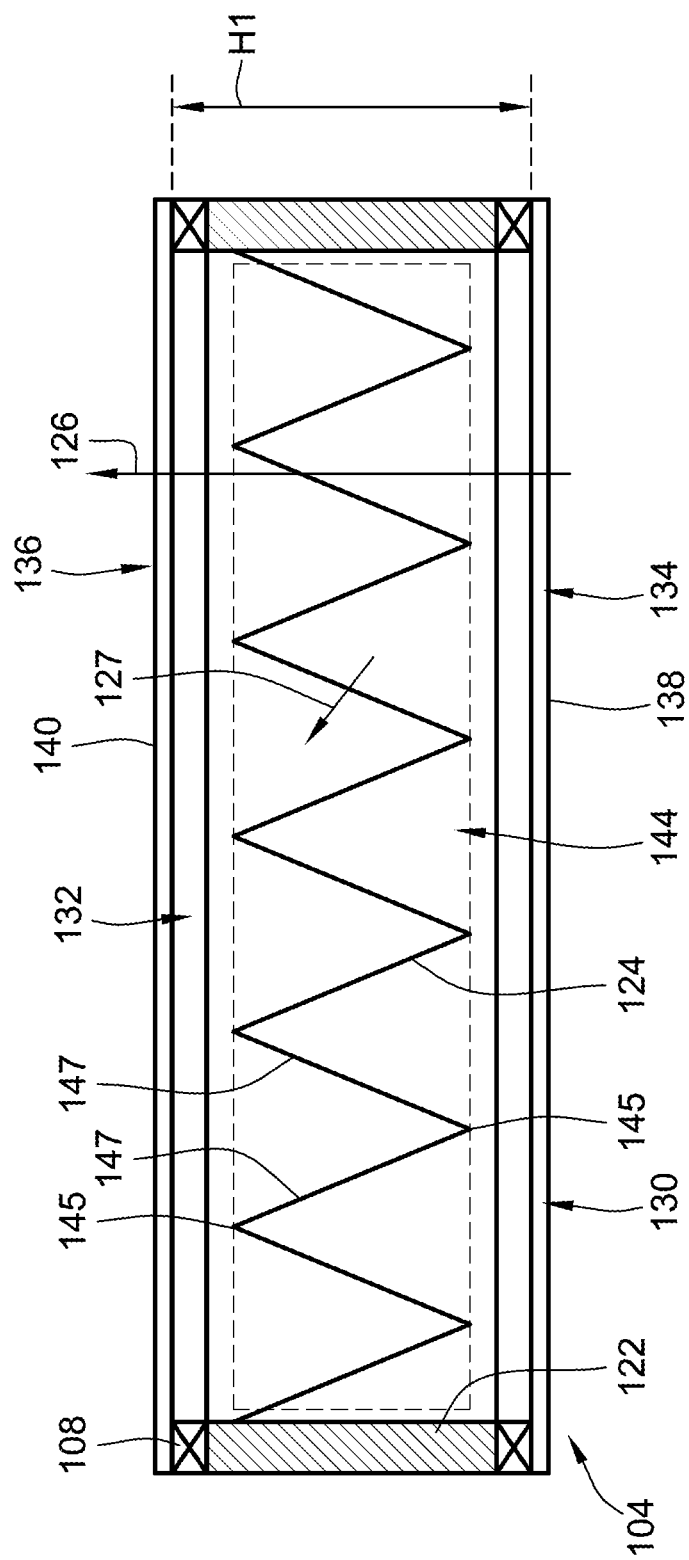
FIG. 2 is a simplified cross-sectional illustration of the filter of the filter system of FIG. 1.

With reference to FIG. 2, the filter 104 includes a filter housing such as a frame 122 that defines or supports, at least in part, the filter house interface 108 (e.g. frame 122 can be a rectangular border frame to provide rectangular interface 108 as shown schematically in FIG. 3). The filter house interface 108 could simply be a sealing surface provided by the frame 122. The filter house interface 108 could include a seal material supported or otherwise attached to the frame 122. Further, the filter house interface 108 may optionally include devices for securing the filter house interface 108 to the filter mounting interface 106, e.g. bolts, straps, latches, buckle clamps, interconnecting retainer components such as one or more catches, flanges or grooves that cooperate with corresponding catches, flanges or grooves, or any combination thereof, etc. Filter media 124, illustrated schematically, is operably sealingly mounted to frame 122 to prevent fluid from bypassing the filter media 124 as it flows through the filter 104, illustrated schematically by arrow 126.

The frame 122 defines a dirty fluid inlet upstream of filter media 124 in the form of opening 130 and a clean fluid outlet downstream of filter media 124 in the form of opening 132. Opening 132 will extend through the filter house interface 108 such that air that has been filtered can flow into the filter house module 102 through filter mounting interface 106.

As noted above, the filter 104 is significantly larger than prior filters. In this embodiment, the frame 122 forms at least part of the shipping container used to ship the filter 104 from a remote location, e.g. a filter fabrication or reconditioning/re-building facility, to the site where the filter house module 102 is located and filtration will occur, e.g. the site where the gas turbine is located.

In this embodiment, the shipping container is a standard, intermodal, six-sided container with three pairs of spaced apart parallel sides, each pair extends perpendicularly between the opposed sides of the other two pairs. Each side being generally rectangular. Opening 130 is formed in a first side 134 of the shipping container and opening 132 is formed in an opposite side 136. In this embodiment, the openings 130, 132 happen to extend through top and bottom sides of the container.

By forming the filter 104 as a shipping container, filter 104 can be easily and cost-effectively shipped to remote locations. Further, if standard intermodal shipping container dimensions are utilized, a large shipping network (tractor-trailer, rail car, barge, etc.) is available for delivering and transporting the filter 104 throughout the world.

Figure 9:
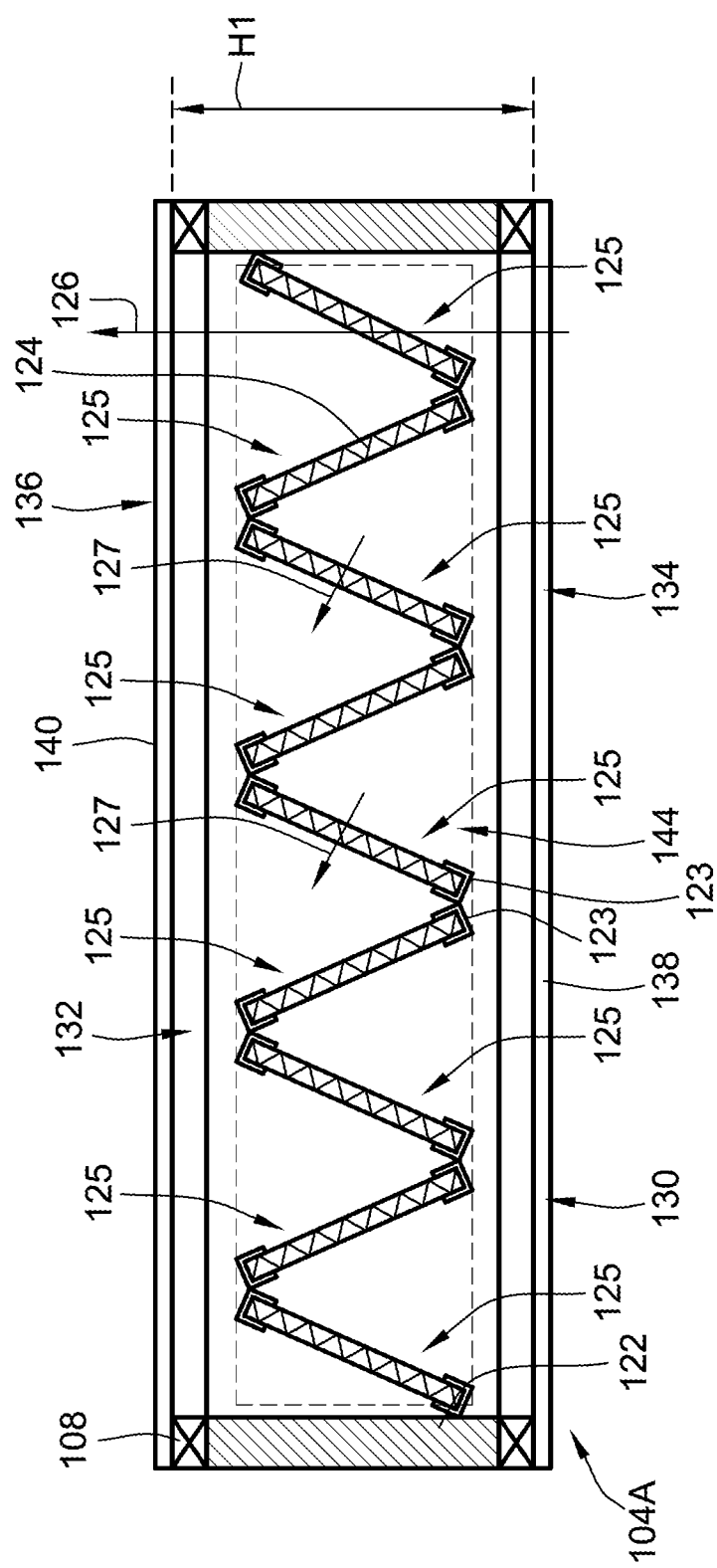
FIG. 9 is a simplified cross-sectional illustration of a filter for use in the filter systems disclosed herein.

Covers 138, 140, illustrated in schematic form and also illustrated in FIG. 9, can be provided to cover openings 130, 132, respectively, while transporting the filter 104 and prevent damage or fouling of the filter media 124 when in transit. Depending on the distance traveled and expected travel conditions, the covers 138, 140 could simply be flexible material covers such as a tarpaulin made of plastic or canvas. A flexible cover could be in the form of a rolled up cover that can be easily rolled up and unrolled for easy storage and deployment, as well as for reuse. Alternatively, the covers 138, 140 could be a rigid cover such as a sheet metal or other material to provide additional protection to the filter media 124. Cover 140 would likely be removed prior to mounting the filter 104 to the filter house module 102. Typically, the filter house interface 108 would need to be exposed and uncovered prior to mounting. Cover 138 could be removed after the filter 104 has been mounted to the filter house module 102 and any filter positioning unit 110 and/or trailer 114 (FIG. 1) is removed. This is because, in this embodiment, cover 138 would likely be inaccessible until the filter 104 has been lifted off of trailer 114 or any other transport device, e.g. a rail car.

Preferably, the filter media 124 is not manipulated relative to the frame 122 once the filter 104 is shipped. More particularly, the filter media 124 remains in a constant position relative to the frame 122 defined by the shipping container when the filter 104 is shipped as well as after the filter 104 is mounted to the filter house module 102 and while the filter 104 is in use.

In an embodiment, the filters 104 cannot be manipulated by individuals. In some embodiments, the filter 104, in a clean state, weighs in excess of 50 lbs, more particularly in excess of 200 pounds and even more typically in excess of 300 lbs.

With reference to FIG. 3, a top view of the filter 104 with cover 140 removed, the filter house interface 108 has lateral dimensions including width W1 and length L1 that are substantially equal to the width and length of the filter 104 and/or shipping container that forms the outer periphery of the filter 104. Width W1 is generally perpendicular to length L1 and both dimensions are perpendicular to air flow 126 (FIG. 2) through the filter media 124 and filter house interface 108. Preferably, width W1 is at least 3 feet, more preferably at least 5 feet, more preferably at least 7 feet and most typically about 8 feet. Length L1 is at least 3 feet, more preferably at least 10 feet, more preferably at least 15 feet, more preferably at least 20 feet and even more preferably approximately 40 feet or more. With additional reference to FIG. 4, which is an end view of filter 104, filter 104 preferably has a height H1 that is at least 3 feet, more preferably at least 5 feet, more preferably at least 7 feet and most typically between 8 and 10 feet and most typically 8.5 feet or 9.5 feet. Again, in most preferred embodiments, the filters dimensions will match that of standard intermodal shipping containers. However, other custom sized filters/containers could be implemented that incorporate the large scale filter concept presented herein.

Figure 6:
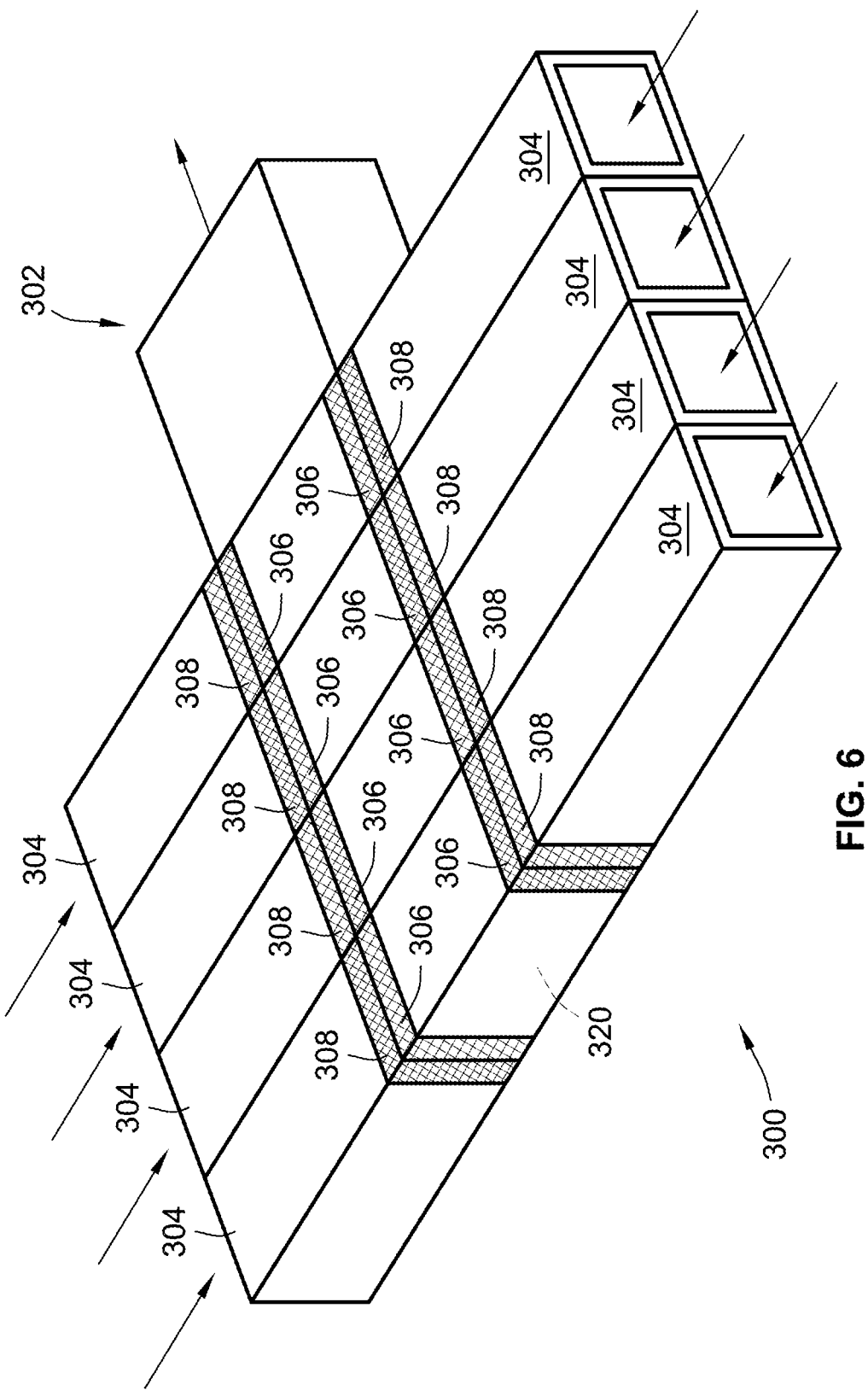
FIG. 6 is a simplified schematic illustration of a further filter system.

In some embodiments, the filters will be end mounted to the filter house module (see e.g. FIG. 6). In such an embodiment, the filter house interface dimensions would correspond to width W1 and height H1 of the shipping container. In an end mounted filter, the cover could take the form of standard doors which provide access to an end of a shipping container. The doors could swing open when it is desired to mount the filter to a filter house module.

With reference to FIG. 1, in some embodiments, the minimum depth D2 of the clean air volume 120 of the filter house module 102 is less than a height H1 (see e.g. FIG. 2) of the filter 104. Depth D2 is generally parallel to the axis along which the air flows through filter 104 as well as through filter mounting interfaces 106, 108. By providing the larger filters 104 that are not individually manipulated by a technician, there is no need for depth D2 to be greater than the height H1 of the filter such as in prior embodiments. In prior embodiments, it was often required to remove and insert the filters from a tube sheet from within the empty volume within the filter house module 102 in an axial direction. However, this often required a large open volume that provided enough room for the technician and/or the filter element during maintenance intervals. However, other than during maintenance intervals which are a very small time of the useful life of the system, this is an inefficient use of space and material.

With reference to FIG. 2, it can be appreciated that the frame 122, e.g. shipping container, will define an interior cavity 144 that defines a cavity volume. The filter media 124 is located within the cavity 144. Further, the filter media 124 establishes a theoretical three-dimensional outer periphery represented by dashed lines in FIGS. 2 and 3. This theoretical three-dimensional outer periphery would be equivalent to a smallest rectangular box in which the filter media 124, in its installed shape and configuration, could be housed. Notably, the dashed lines are moved slightly inward from the actual theoretical three-dimensional outer periphery for illustrative purposes. This theoretical three-dimensional outer periphery bounds a theoretical volume. This theoretical volume is preferably at least 75 percent of the cavity volume, more preferably at least 85% and even more preferably at least 95% of the cavity volume.

In one embodiment using a standard shipping container dimension of 40 ft×8 ft×8.5 ft, the filter media 124 has at least 3500 square feet of filter media and more preferably at least 4000 square feet of filter area based on a pitch of 1 pleat per length of the shipping container and a pleat panel of approximately 7 feet by 7.5 feet. However, simply doubling the pleat pitch to 2 pleats per foot, e.g. 4 pleat panels per foot of length, a filter can have in excess of 8000 square feet of filter media. Preferably, the filter media 124 has a surface area per cubic foot of theoretical volume of approximately 3.25 and more preferably about 3.4 feet squared of filter media surface area/cubic foot of theoretical volume.

Figure 10:
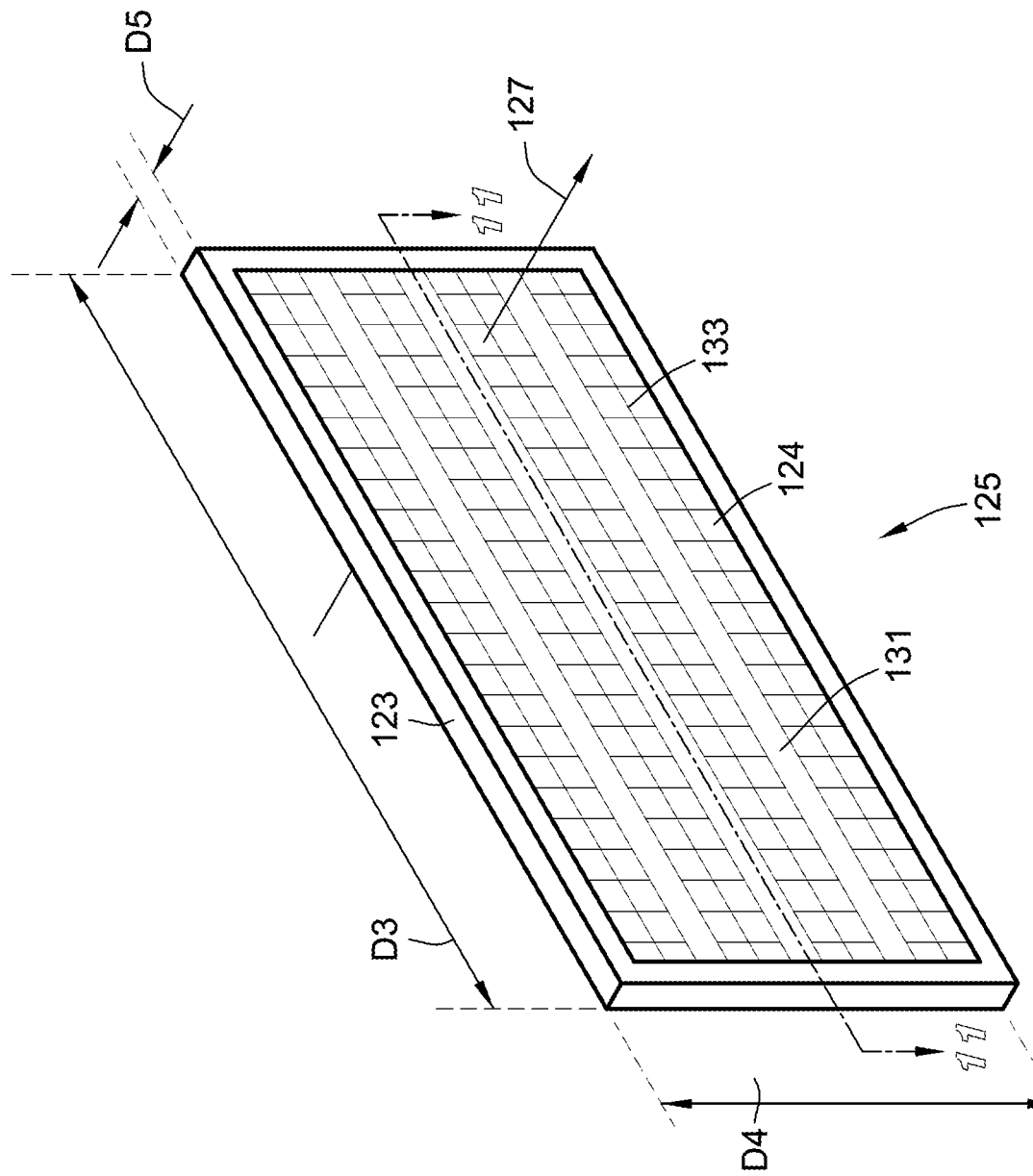
FIG. 10 is a perspective illustration of a filter media pack used in the filter of FIG. 9.
Figure 11:
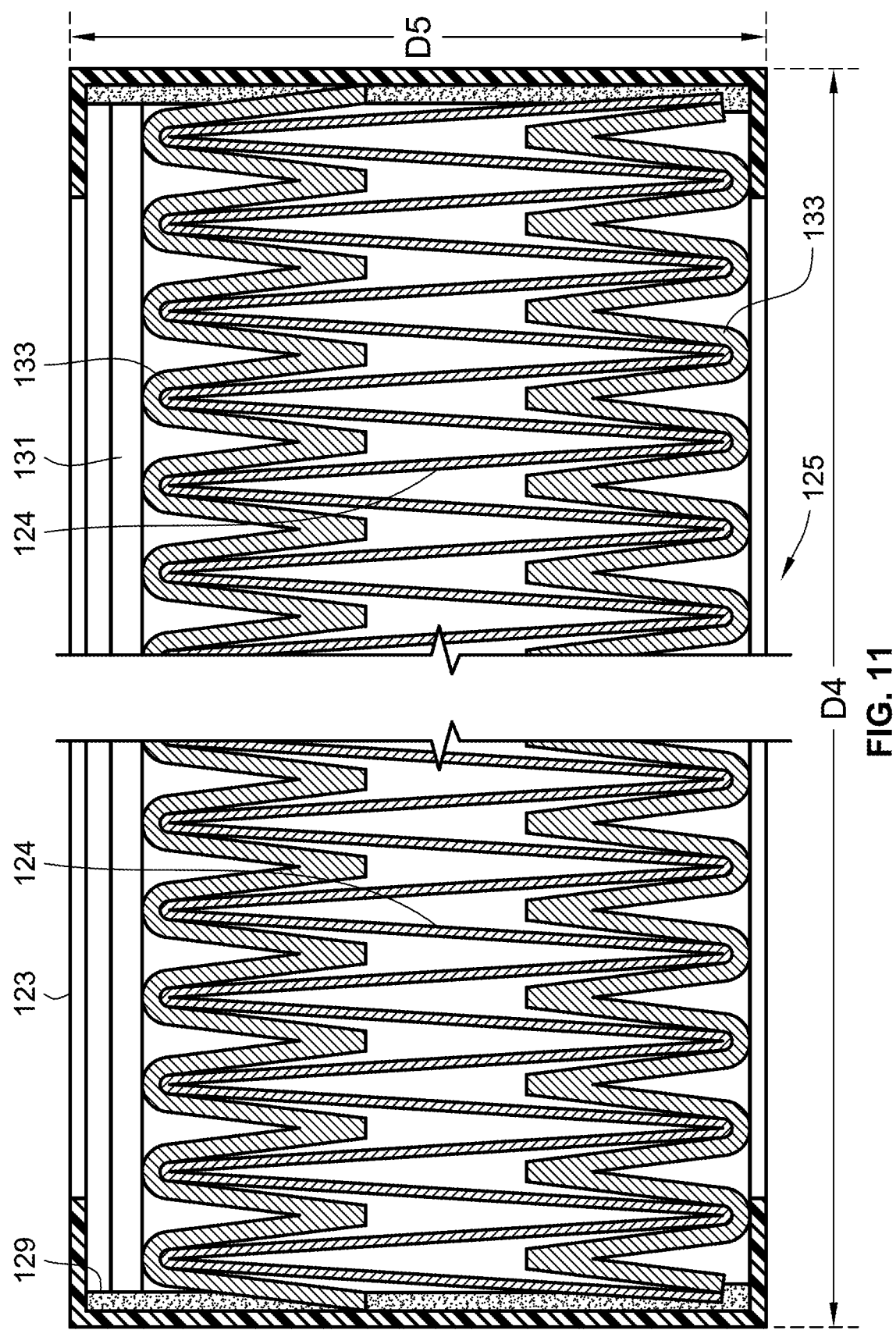
FIG. 11 is a cross-sectional illustration of the filter media pack of FIG. 10.

With reference to FIGS. 9-11, the filter media 124 can take various configurations within the frame 122. In the embodiment illustrated in FIG. 9, the filter media 124 of filter 104A is provided by a plurality of filter media packs 125, which may also be referred to as panel filters. Preferably, the filter media packs 125 are pleated filter media packs. The filter media packs 125 are generally illustrated in a schematic form in FIG. 9 and in a more detailed yet still schematic form in FIGS. 10 and 11. Each pleated filter media pack 125 is provided by a sheet of filter media folded to form a plurality of pleat panels extending between adjacent folds. The sheet of filter media is supported by a border frame 123 that surrounds the rectangular periphery of the folded sheet of filter media. The border frame 123 could be formed from metal, plastic or even cardboard in various configurations. The border frame 123 will typically seal the edges of the sheet of filter media 124, typically by use of an adhesive 129.

With reference to FIG. 10, each pleated filter media pack 125 has first and second dimensions D3 and D4 that are generally perpendicular to one another and generally perpendicular to a flow of air through the filter media illustrated by arrow 127, the first dimension D3 being at least 85% of the width W1 of the shipping container and at least 85% of a height H1 of the shipping container. Typically, the first dimension would be substantially equal (e.g. greater than 95%) of the width W1 and height H1 of the shipping container and frame 122. Further, the second dimension may be greater than the height H1 depending on the angle of the filter media pack 125. Further, the pleated filter media pack would have a depth D5 measured parallel to arrow 127 that is at least 0.5 inches and may extend up to 6 or more inches.

With reference to FIGS. 10 and 11, to help support the filter media 124 within the filter media pack 125, media supports 131, 133 may be placed over one or more of the faces of the filter media pack 125. Media support 131 is a generally flat strip of material, typically cardboard or metal extending across a face of the filter media 124, typically the outlet face. Media supports 131 will typically be secured to the folds of the pleated filter media 124. Media supports 133 may be in the form of strips/beads of adhesive material applied to the filter media in a fluid state and then hardened to provide structural strength. Alternative media supports 133 could be in the form of pleat spacers that are preformed and then attached to the folded filter media 124 and extending into the spaces between adjacent pleat panels. Such spacers could be formed from metal, wire mesh, plastic, etc. The inclusion of the media supports 131, 133 is beneficial due to the size of the filter media pack 125 as they are designed to, in at least some embodiments, extend substantially the entire width and height of an intermodal shipping container (e.g. first and second dimensions D3 and D4 can each exceed 6 ft. The media supports 131, 133 extend between opposed sides of the filter media pack 125 and typically perpendicular to the folds of the filter media 124.

FIG. 11 illustrates a representative cross-sectional illustration of the filter media pack 125. In FIG. 11, the various folds and filter media panels extending between the alternating folds are illustrated. In FIG. 11, the media supports 133 are illustrated on both the inlet and outlet side of the filter media pack 125.

As illustrated in FIG. 9, the filter media packs 125 are assembled within the frame 122 in alternating V orientations. A seal arrangement will be provided between the border frames 123 of adjacent filter media packs 125 to prevent undesirable leakage of dirty fluid. The seal member could take many forms. It could be a bead of adhesive filling the gap/joint between adjacent filter media packs 125. It could be in the form of a flexible tape adhered to adjacent filter media packs 125 to seal any gap therebetween. A reusable cap member that snaps onto the border frames of adjacent filter media packs 125 could be used. Filter media packs or panel filters according to those disclosed in International Patent Application PCT/US2017/016832 having International Publication Number WO 2017/139268, incorporated herein in its entirety by reference thereto, that incorporate mold-in-place side panels molded along the periphery of the filter media pack are contemplated to be incorporated. In such panel filter, the media is embedded in the flexible polyurethane material that provides both structural support as well as a seal between the panel filter and the structural frame in which it is mounted, e.g. such a reusable cap or cap permanently affixed to the frame 122.

Further, while not illustrated, the sidewalls of the frame 122 may include mounting structure for securing the individual filter media packs 125 to the frame in a sealed manner, again to prevent dirty fluid bypass. Preferably, the mounting structure allows for easy replacement of the filter media packs 125 for easy reconditioning and reuse of frame 122. For example, the frame 122 may include channels provided by the sidewalls of frame 122 that the filter media packs 125 axially slide in and out of for easy replacement. Further, a seal member may be provided between the frame 122 and the filter media packs 125. Further, in a preferred embodiment, the replaceable filter media packs 125 are entirely incinerable.

To further provide support for the media, it is contemplated that the filter media 124 could be embossed, such as illustrated in International Patent Application No. PCT/US2016/047283 filed Aug. 17, 2016 and assigned to the instant assignee or an affiliated company thereof, the teachings and disclosures of which are incorporated herein by reference thereto. More particularly, the filter media may be pressed pleated media and more preferably heat pressed pleated media and even more preferably heat pressed, embossed, pleated media. Again, these features help prevent the filter media collapsing due to the size of the filter media packs 125 along the first and second dimensions D3 and D4. It is noted that embossed pleated media may have some panels embossed while other panels are unembossed, e.g. alternating embossed and unembossed panels. Further, embossed pleated media may have a portion of the panels embossed while another portion of the pleat panels remains unembossed.

In an alternative arrangement, such as in filter 104 illustrated in FIG. 2, the filter media is provided by a sheet of filter media 124 that is mounted within the frame in a zig-zag shape forming a plurality of folds 145 and a plurality of panels 147. The filter media 124 is illustrated schematically and the pleat density would be much greater and is not illustrated to scale. The panels 147 extend between the folds 145. Each panel 147 has first and second dimensions D6 (FIG. 3) and D7 (FIG. 2) extending generally perpendicular to one another and perpendicular to air flow through the panel 147 (again illustrated by arrow 127 in FIG. 2). These first and second dimensions D6, D7 are similar to those discussed with regard to the pleated filter media packs. However, in this embodiment, the thickness of the panels 147 would be the thickness of the sheet of filter media and not be defined by the depth D5 of the pleated filter media packs 125. The edges of the sheet of filter media between which the folds 145 and panels 147 extend would be operably sealed to the frame 122. In one embodiment, an adhesive may be applied to the sidewalls of the frame 122 and the edges of the sheet of filter media.

In some embodiments, the ends of the pleats may be sealed to each other creating a pocket between the two adjacent surfaces of the adjacent pleat panels. In this arrangement, a seal would be required between the shipping container at the top of the pleats where the pleats no longer require an individual seal to seal the pleats.

It is a further of systems incorporating the large scale filters described herein that cleaning and clearing debris that has been back pulsed from the filters can be simplified. For example, the debris would, such as for the embodiment of FIG. 1, fall to the ground below the filter with the help of gravity. The debris can then be regularly swept up, removed with a machine such as a skid steer or sweeper, or automatically evacuated with an in-ground conveying system. Such an in-ground conveying system could be located under steel grating allowing for both a filter install surface above and debris removal underneath.

It is contemplated that the dimensions D6 and D7 may be in excess of 3 ft and more particularly similar to the width and height of an intermodal shipping container, e.g. at least 85% of the width and height of an intermodal shipping container. It is contemplated that the filter media 124 could be formed using the process identified in International Patent Application No. PCT/US2016/047283 filed Aug. 17, 2016 and assigned to the instant assignee. Again, due to the size of the dimensions D6 and D7, it may be beneficial to emboss the panels 147. The embossments will be useful by preventing the panels 147 from collapsing on one another, thereby, restricting airflow.

Embossments formed into the filter media sheet can maintain a consistent depth and height for at least 90% of the length between the corresponding pleat tips (i.e. folds 145) that are formed during pressing and pleating. This provides a maximum ridge strength and structural integrity such that the pack when formed maintains considerable strength when subjected to an air flow in application. Specifically, the spacing between the adjacent pleat panels is maintained during air flow, and the pleats do not collapse or blind off on each other due to the embossments which provide for structural support and integrity of the pleats. This maintains open and good air flow between adjacent pleat panels due to little contact or minimal contact between adjacent pleat panels 147 to maximize the usage of the filter media contained within the filter media sheet.

It is further contemplated that thicker filter media than conventional filter media may be incorporated such that can provide further structural strength and/or provide the ability to form larger embossments. For example it is contemplated that a thickness of the media may be greater than 0.200 inches and preferably greater than 0.250 inches. It is contemplated that a media with a thickness of 0.50 inches could be incorporated. The media may have a combination of fibers including cellulose, polyester and glass as well as nano-sized fibers to improve filtration. The embossments could be as deep as 0.500 inches and preferably 1.0 inch or even 1.5 inch or more. The embossments could be formed into the media using rotary nip tooling or the process identified above in International Patent Application No. PCT/US2016/047283 filed Aug. 17, 2016. Further, the media can be pleated and reinforced such that it could be placed and lowered into a mold that pours a seal around the filter media, such as discussed above with regard to International Patent Application PCT/US2017/016832. Thereafter, the filter media pack and seal can be installed into the intermodal or pallet sized containers described herein It is contemplated that the filter media 124 could be formed from fluted media as well. In such an embodiment, a support structure would be applied across the outlet face of the fluted media to prevent telescoping of the fluted media. The fluted media could be provided by winding a continuous a corrugated sheet and flat sheet (as is known in the art) into a large racetrack shaped media pack and installed in the frame 122. However, due to the size of the media pack necessary to fill the interior cavity 144 of an intermodal shipping container, it may be difficult to provide a tight packing of adjacent layers. Alternatively, stacked strips of fluted filter media (each strip would have both a corrugated sheet and a flat sheet as is known in the art) could be used. Adjacent strips of fluted filter media would likely be easier to secure to one another while avoiding possible leak paths. Further, a media pack formed from stacked strips of filter media would be easier to shape and size to the shape and size of the interior cavity 144. For instance, the voids between the rounded ends of a wound media pack and the interior of the frame would be filled with filter media.

The sides of the container defined by/defining frame 122 define a dirty fluid inlet. Further, the sides protect the filter media during shipment of the filter.

In a preferred implementation, filter media 124 is replaceable and the frame 122 is reusable. More preferably, the filter media and/or filter media packs are incinerable.

Other methods of mounting the filter media in the frame of a filter are contemplated. For example, a frame could include a series of bars spanning between parallel walls of the container/frame where the media is threaded around the spanned bars creating panels extending between the adjacent bars. The media would then form a zig-zag pattern as it is wrapped around the adjacent bars. This arrangement would not require the media to be preformed. The edges of the media adjacent the parallel walls would be sealed to the walls. This could be done by applying an adhesive bead to the media adjacent the parallel walls to both secure the media to the walls and form a seal. Further yet, a U shaped track could be attached to each of the walls to receive the free edges of the media. An adhesive can be applied in the U-shaped track to seal the edges to the walls.

Figure 5:
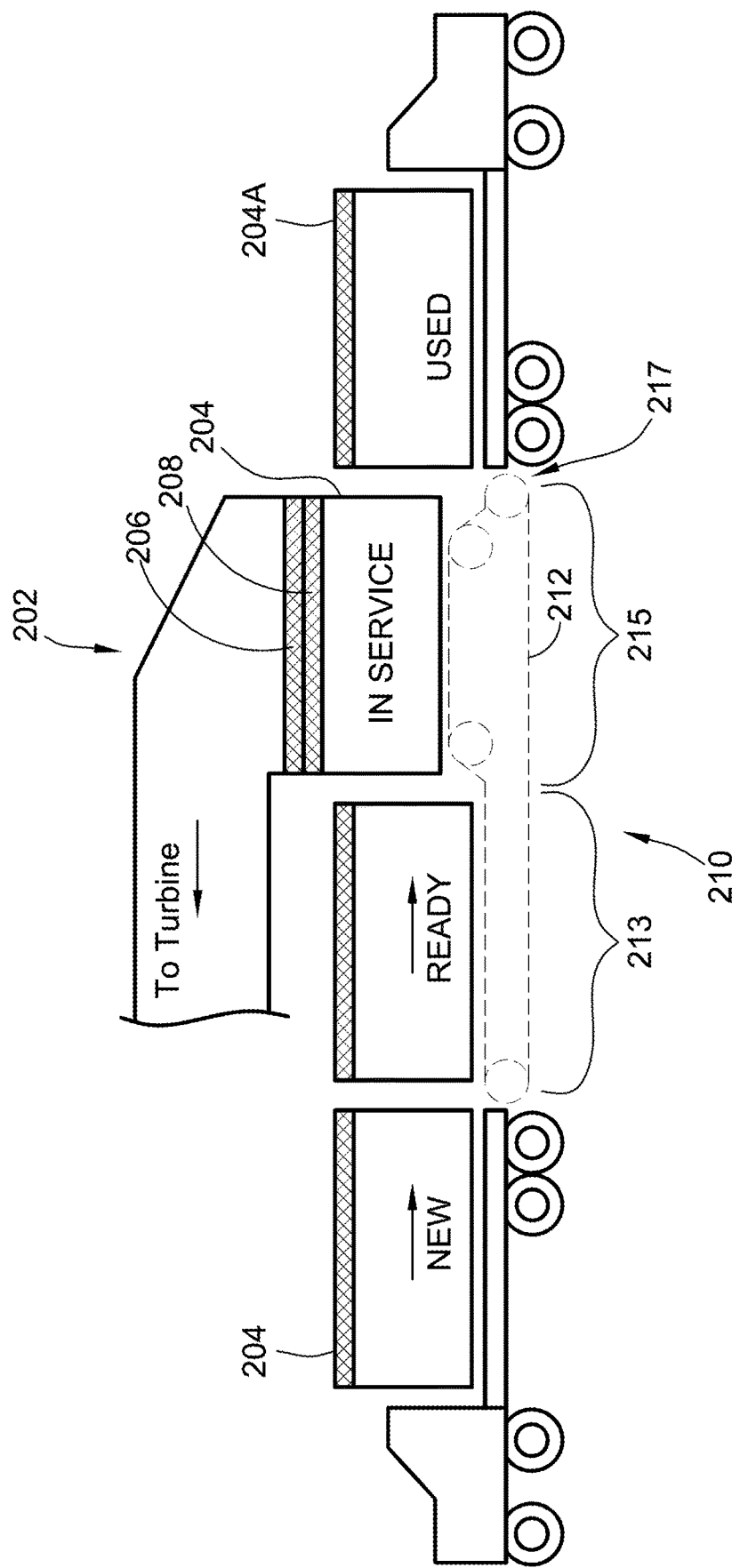
FIG. 5 is a schematic illustration of a further filter system.

FIG. 5 illustrates a further filter system 200. This filter system is similar to the prior system in that it includes, at a minimum a filter house module 202 that is similar to or identical to filter house module 102 and uses filters 204 that are similar to or identical to filters 104 and 104A and alternatives thereof described above. However, the filter positioning unit 210 of this embodiment is modified. Thus, the way in which the filter 204 is handled is modified.

In FIG. 5, the filter positioning unit 210 includes a conveyor 212 that has a delivery region 213 and a mounting region 215. The delivery region 213 is spaced away from the filter house module 202 where a filter can be placed on the conveyor 212 or removed from the conveyor 212 when a spent filter 204 is removed from the system 200. The mounting region 215 is located adjacent the filter mounting interface 206 where the filter 204 can be attached to the filter mounting interface 206. The delivery region 213 need not be as large as illustrated such that the conveyor 212 is substantially the same length as the filter 204. In such an arrangement, as the spent filters are being removed and put onto a trailer and while new filters are being put into place, the filter will be partially located under filter mounting interface 206 and on the trailers for delivering and removing new and spent filters, similar to the situation as illustrated by filter 204A in FIG. 5

The filter positioning unit 210 and particularly the conveyor 212 thereof transitions the filter 204 and particularly the filter house interface 208 into engagement with the filter mounting interface 206 when the conveyor 212 transitions the filter 204 from the delivery region 213 to the mounting region 215. Further, when the filter 204 is spent, the filter positioning unit 210 can be used to transition the filter 204 out of engagement with the filter mounting interface 206 when the conveyor 212 transitions the filter from the mounting region 215 to the delivery region 213. The conveyor 212 could be a permanent fixture or a unit that is moved out of the way once the filter 204 is mounted. Further, the conveyor 212 could be configured to raise and lower so that once the filter 204 is moved to the mounting region 215, the conveyor 212 raises to engage the filter 204 with the filter mounting interface 206 of filter house module 204.

A filter positioning unit that utilizes a conveyor could use a same location to deliver clean filters as well as to remove spent filters from the system. For example, the conveyor could move in a first direction to move clean filters toward the filter house module and in an opposite second direction to remove spent filters. Alternatively, spent filters could be removed from the system at a removal region 217 on an opposite side of the filter house module 202. This configuration is illustrated by filter 204A in FIG. 5 being loaded onto a trailer at an opposite end of the conveyor 212 as the end where new filters 204 are loaded onto the conveyor 212. The filter 204A can have the filter media therein replaced with clean filter and shipped back to the site to be used again. Here, the frame can be reused.

In FIG. 5, conveyor 212 has a raised region proximate mounting region 215 to assist in transitioning the filter 204 into engagement with the filter house module 202.

In some embodiments, it is contemplated that the conveyor 212 is movable relative to filter mounting interface 206. As such, clean filters could be delivered to and/or stored at a central location. The conveyor moves to the central location to acquire a clean filter and then moves back to the filter mounting interface 206 to install the clean filter. Further, the conveyor 212 could be configured to transport spent filters to a same or different central location where spent filters are stored until they can be hauled away. As such, a delivery truck could drop clean filters which are ultimately transported to the filter mounting interface by conveyor 212 and then be loaded with spent filters that were transported away from the filter mounting interface 206 by conveyor 212. The clean and spent filters could be at a same or different centralized location(s). Such a conveyor could be mounted on rails. Further, in some embodiments multiple conveyors could be incorporated. For instance, one conveyor could transport clean filters while a second conveyor could transport spent filters.

Further yet, the conveyor system running on rails or other system of mobility could be automated. Thus, when the system determines that a filter becomes spent, the system automatically blocks out air flow through the filter (such as by using isolation units as described below). The conveyor 212 retrieves the spent filter and deposits it at into a bank of spent filters. This could be a rack of spent filters. The same conveyor or a separate conveyor retrieves a clean filter from a bank of clean filters that are ready for deployment and then transports the clean filter to the filter mounting interface 206.

An advantage of this automated system is that the intake system could be smaller such that the overall media area in use is reduced. This would require changes more often, but if the change out is automated, that can be easily managed and manual labor would be minimal. Current systems are very large due to the requirement to mount a large number of smaller filters (e.g. an excess of 800 individual filters in some systems). Further, due to the significant amount of manual labor required for change out as well as the undesirable amount of downtime for the overall system, the systems are made very large such that a very large amount of filter media surface area is present. This allows the system to stay online without filter change out for, in some instances, 2 or more years while still maintain a very small change in pressure drop. However, with the automated system and large scale filters, the amount of actual in service filter media (e.g. surface area) can be reduced because the filter media need not last as long between change out periods due to the significantly reduced amount of manual labor and/or system downtime. Here, change out can simply occur more regularly due to the ease and quickness due to the large filters and/or automated system.

A further filter system 300 is illustrated in FIG. 6. This filter system 300 is similar in many respects as the prior filter systems 100, 200. However, in this embodiment, the filter house module is in the form of a hub arrangement 302 for mounting a plurality of filters 304.

The hub arrangement 302 will include a plurality of filter mounting interfaces 306 which fluidly communicate with a clean air volume 320 defined by the hub arrangement 302 into which the air from all of the filters 304 flows after it passes through the filter media thereof. Each filter 304 includes a filter house interface 308 that mates with a corresponding one of the filter mounting interfaces 306.

Again, one or more filter positioning units will transition the filters 304 into a corresponding mounting position with the corresponding filter house interface 308 adjacent the corresponding filter mounting interface 306 to attach the filters 304 to the filter house module 304. The filter positioning unit could include one or more conveyors if it is similar to that of filter system 200. Alternatively, one or more lifting units could be provided. In some embodiments, the filter positioning unit could simply be the trailer that delivered the filter 304.

In this embodiment, the filter house interface 308 of the filters 304 is provided as an end of the shipping container as compared to a top of the shipping container. While an opposed end of the shipping container is illustrated as being the dirty air inlet, the dirty air inlet could be provided in a different side such as the top or bottom.

Figure 7:
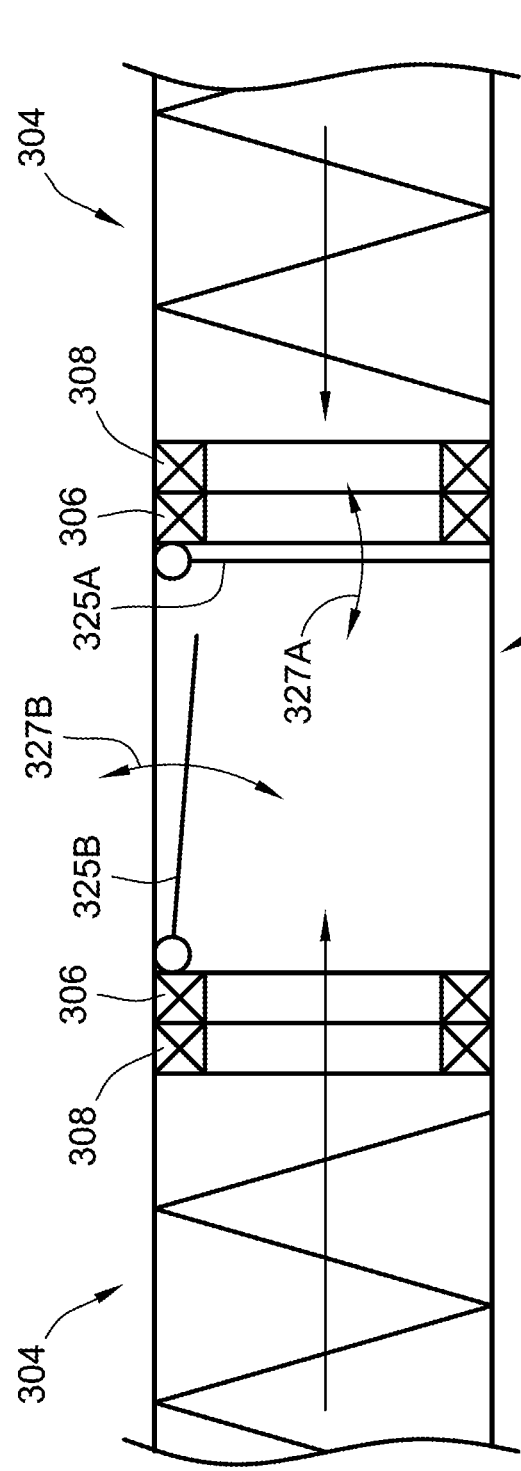
FIGS. 7 and 8 are partial illustrations of the filter system of FIG. 6.
Figure 8:
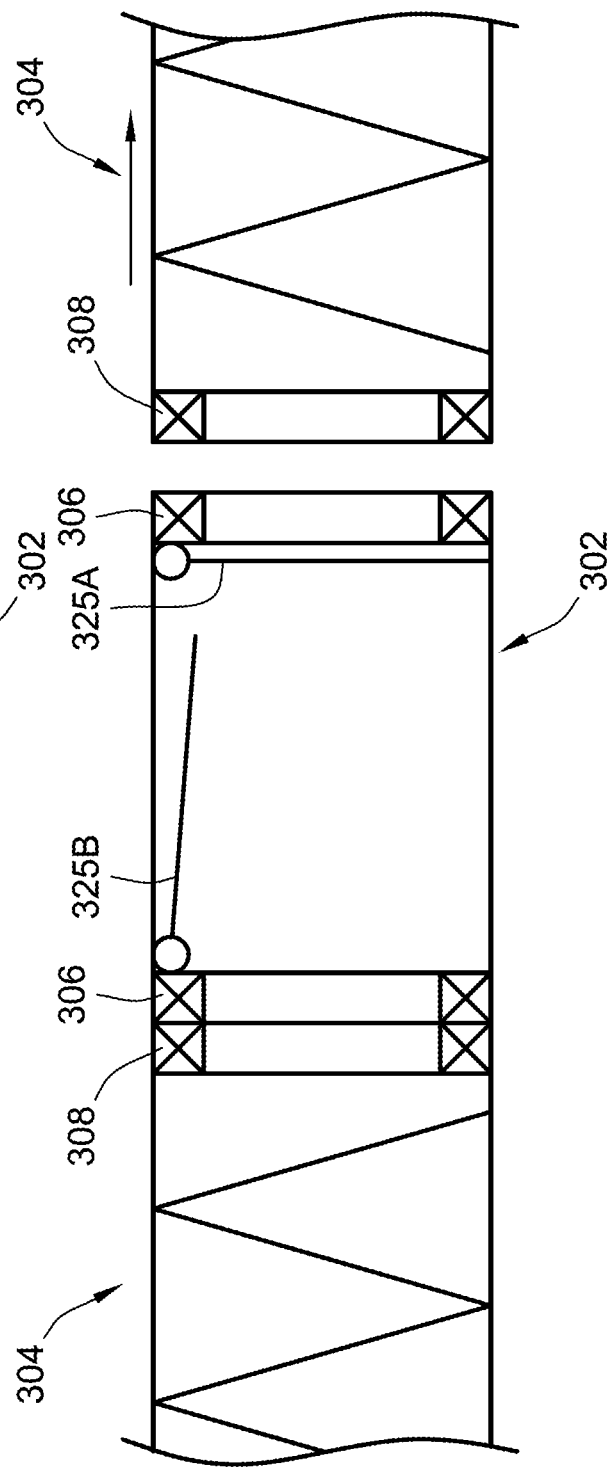

With additional reference to FIGS. 7 and 8, by providing multiple filter mounting interfaces 306 and multiple filters 304 simultaneously, individual ones of the filter mounting interfaces 306 can be isolated from the rest of the filter house module 302 and particularly the clean air volume 320 such that the corresponding filter 304 can be serviced without causing the filter system 300 and more importantly the downstream gas turbine to go offline.

In FIGS. 7 and 8, isolation units 325A, 325B are illustrated downstream of corresponding filter mounting interfaces 306. The isolation units 325A, 325B are transitionable (illustrated schematically by arrows 327A, 327B) between a blocking position (e.g. isolation unit 325A) in which the isolation unit 325A prevents air flow through the corresponding filter mounting interface 306 and an open position (e.g. isolation unit 325B) that allows for air flow through the corresponding filter mounting interface 306. When the isolation unit 325A, 325B is in the blocking position, the filter 304 mounted to the corresponding filter mounting interface 306 can be removed but air is permitted to flow through at least one other filter mounting interface 306 to continue to allow filtered air to flow through the filter house module 302. This is illustrated in FIG. 8. The isolation unit 325A, 325B could rotate, as illustrated schematically in FIG. 7 or could be slidably mounted.

The isolation units can also be used to assist any pulse cleaning system (see e.g FIG. 1 pulse cleaning system 116). For example, the could be blocked diverting air to other operable filters so that the energy of pulse cleaning system to back pulse the filter that is being cleaned have to overcome the force of the incoming air making the back-pulse of the pulse cleaning system more effective.

Further, it is contemplated that other filter positioning units could be employed for any of the embodiments identified above such as, for example, cranes, elevators, hoists, cable and pulley arrangements, the trailer itself, hydraulic lifts, winch type systems, etc. The filter positioning units need not directly engage or operate on the filters. Instead, the filter positioning unit could be a device that lifts the entire trailer or tractor trailer combination to engage the filters with the filter house module. For example, the trailer could be positioned underneath the filter house module and the entire trailer is lifted, e.g. on a platform that can raise and lower, to engage the filter mounting interface and the filter house interface.

Figure 14:
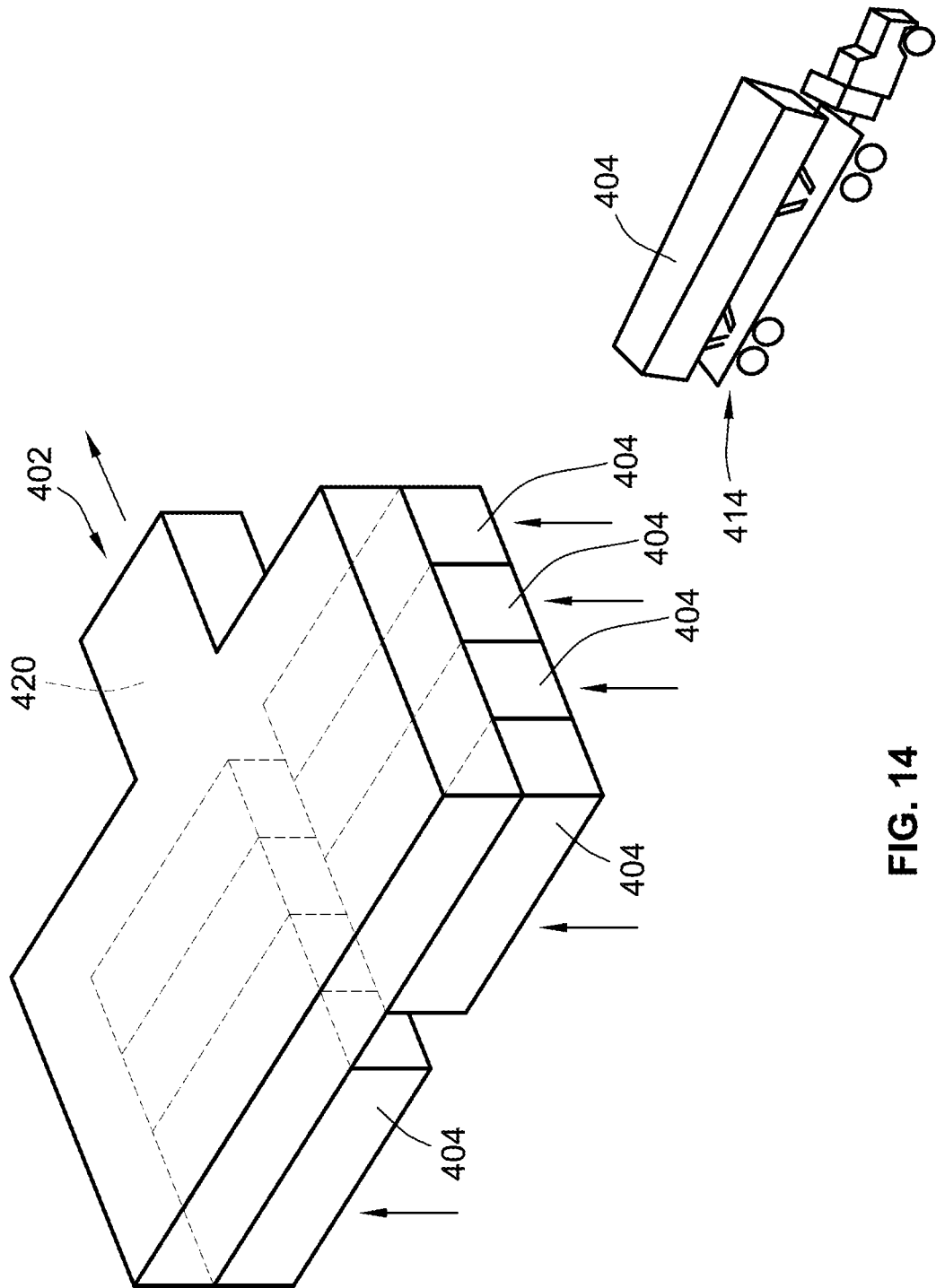
FIG. 14 is a further embodiment of a filter system.

FIG. 14 illustrates a further filter system 400 similar to the filter systems outlined above. One significant difference for this filter system 400 is that the filters 404 are mounted to a vertically bottom side of a filter house module illustrated in the form of hub arrangement 402. The hub arrangement 402, in this embodiment, has eight mounting locations where individual filters 404 are mounted. These mounting locations are illustrated in dashed lines because they are formed on an underside of the hub arrangement 402.

While not illustrated, each filter 404 includes a filter house interface that mates with a corresponding filter mounting interfaces provided by the hub arrangement 402. The filter house interface and filter mounting interface create a sealed connection between a clean air volume 420 of the hub arrangement 402 and a clean air side of the filters 404, which is proximate a top side of the filters 404.

A significant benefit of this arrangement is that the dirt fluid inlet of the filters is on a vertically bottom side of the filters 404. As such, the air entering the filters 404 enters from below the filters 404. This allows the frame of the filters 404 to form a weather shield that protects, at least in part, the filter media from rain and other precipitation depending on the environment. This prevents the need for additional weather hoods to be provided by the filter house, like in prior art systems. To further protect the filter media, the filter media may be spaced vertically above the bottom side of the filter 404 such that it is recessed into the internal cavity of the frame. This is illustrated, for example, in FIGS. 2 and 9 where the bottom dashed line is spaced vertically above the bottom edge of the filter frame 122.

Again, the filters 404 can be provided using intermodal shipping containers as the frame thereof. Filter system 400 illustrates filter 404A being transported by a semi-tractor and trailer combination 414. In this system, the manipulation of the filter 404 relative to the hub arrangement 402 would be similar to system 100 described previously. Further, similar to filter system 300, each mounting location may include an isolation unit (not shown) so that the filters 404 can be replaced without causing the entire system to go offline.

The hub arrangement 402, like hub arrangement 302, could be modular in that it is formed from a plurality of modules connected together. For instance, the hub arrangements could be formed from a plurality of interconnected intermodal shipping containers configured to connect and form the clean air volumes of the hub arrangements.

Figure 15:
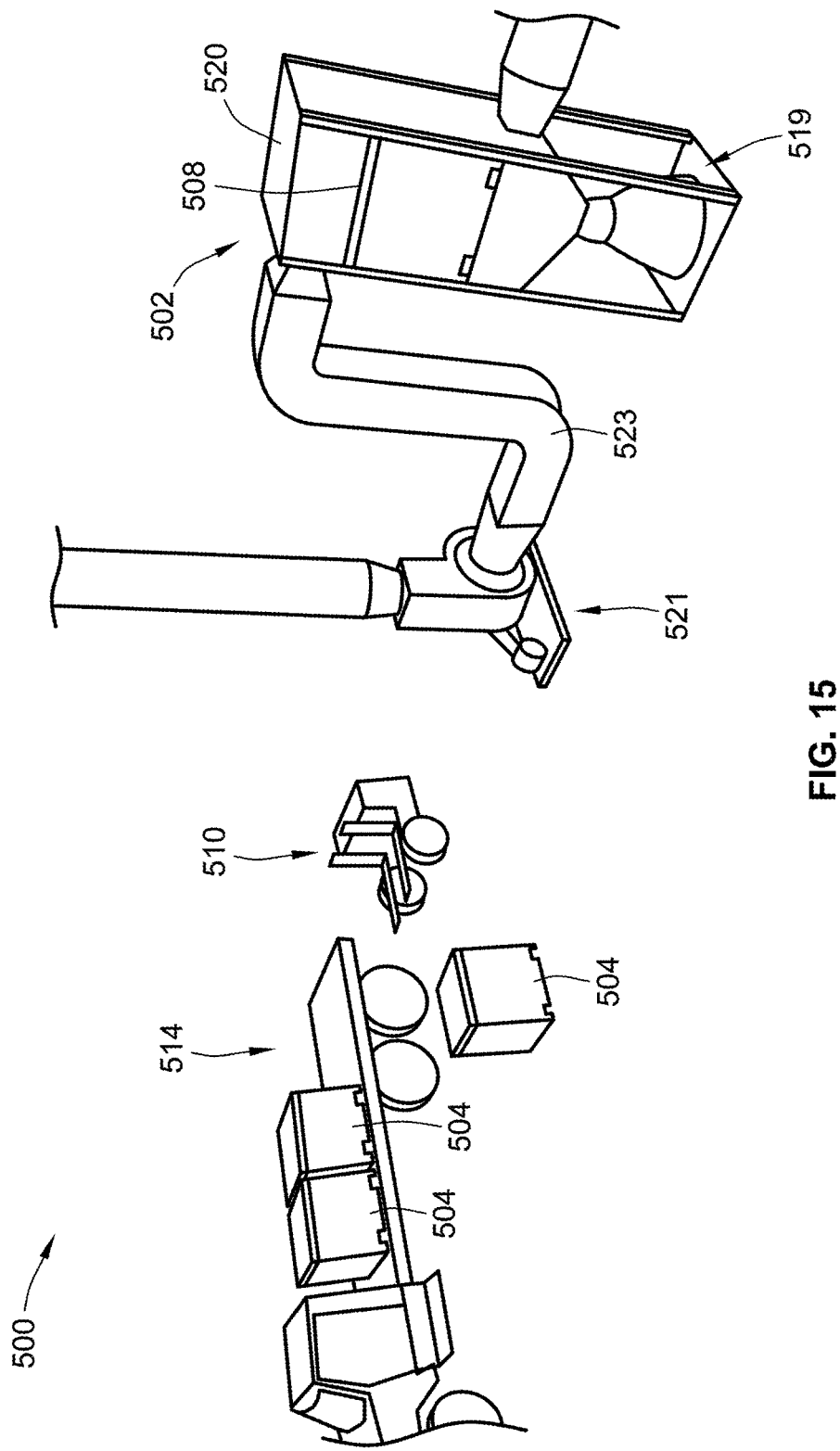
FIG. 15 is a further simplified illustration of a filter system according to an embodiment of the invention.

FIG. 15 illustrates a further example of a filter system 500. The filter system is similar to prior filter systems in that a filter positioning unit 510 is used to handle and move the filters during maintenance intervals. This system would find particular use as a dust collection system. In this embodiment, the filter positioning unit 510 is in the form of a fork lift and particularly a fork lift that is truck-mountable to the trailer 514 upon which the filters 504 are delivered to the site. The fork lift will locate the filter 504 within the filter house module 502.

The filter 504 and filter house module 502 may have cooperating structure for securing the filter 504 therein and securing a filter house interface in sealing engagement with a filter mounting interface. For instance, latches, buckles, bolts, tongue and groove arrangements, hooks, clips, etc. can be used to maintain the filter 504 in proper alignment with the filter house module 502 when the fork lift release the filter 504. In some embodiments, the filter 504 and filter house module 502 may be sized and shaped such that simply sliding the filter 504 into the space provided by the filter house module 502 for the filter 504 will provide sufficient and reliable engagement between the interfaces to maintain a fluid tight seal therebetween.

The filter house module 502 includes a clean air cavity 520 that is fluidly connected to a fan assembly 521 via duct work 523. The filter 504 sits vertically below the clean air cavity. The filter house module 502 includes a dust collection assembly 519 positioned vertically below the filter 504. The filter 504 can be reverse pulsed or vibrated to release collected particles that are collected in the dust collector assembly 519 to extend the serviceable life of the filter 504. The dust collection assembly 519 is positioned proximate the dirty fluid inlet of the filter 504.

Figure 16:
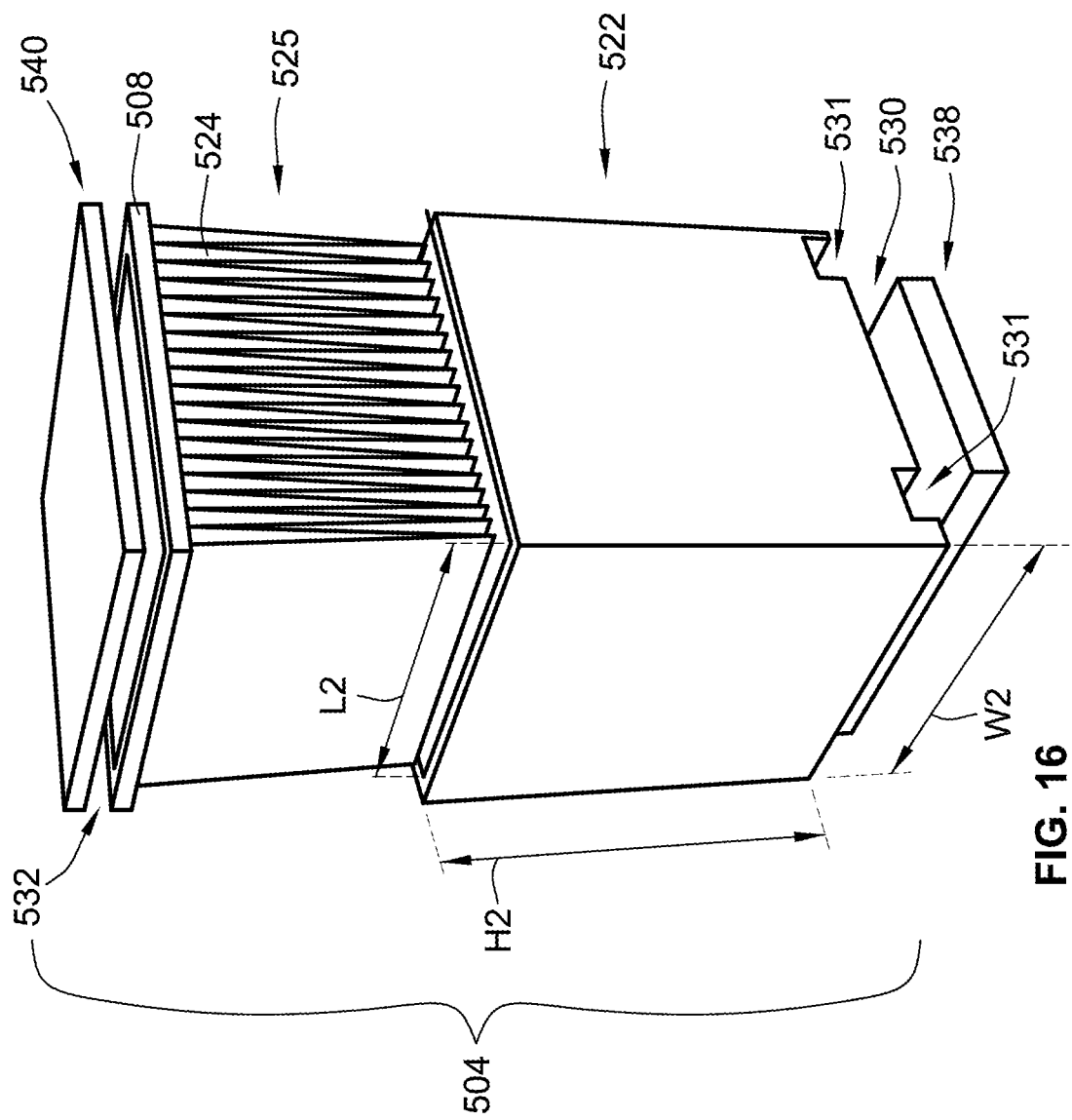
FIG. 16 is an exploded illustration of a filter used in the filter system of FIG. 15.

FIG. 16 illustrates a partially exploded illustration of the filter 504. The filter 504 includes a filter media pack 525 that includes filter media 524 and a seal member that provides the filter house interface 508 that operably seals with the filter mounting interface (not shown) of the filter house module 502. The seal member is also used to seal the filter media 524 to a frame member 522 of the filter 504. Frame member 522 may be considered a border frame or filter housing.

Removable covers 538, 540 operably cover dirty fluid inlet 530 and clean fluid outlet (defined by filter house interface 508), respectively, during transport. Preferably the covers are reusable. The covers may be operably secured to the frame member 522 by buckles, latches, snap connection, tongue and groove arrangements, bolts, straps, etc.

The filter 504, and particularly, frame member 522 includes fork pockets 531 sized and configured to receive the forks of the fork lift. Preferably, these fork pockets 531 extend the entire width W2 of the frame member 522 such that the fork pockets 531 extend through opposed sides of the frame member 522. Thus, the filter 504 can be transported by the fork lift from either side. It is noted that removable cover 538 is sized to be positioned, between fork channels 531 so as to allow for removal of the cover while being supported by the fork lift and prior to being installed in the filter house module 502 or for attaching the cover 538 after a spent filter has been removed from the filter house module 502 and prior to being transported to trailer 514.

Filter 504 may be used as the filter for prior systems when smaller filter dimensions are desired, e.g. where lower filtration capacities are required. As such, in one embodiment, the filter 504 is "pallet sized" e.g. similar to standard sized used for shipping paletted products. In one embodiment, the height H2 is between 2 and 5 ft, the width W2 is between 2 and 5 feet, and the length L2 is between 2 and 5 feet. These filters 504 may weigh between 10 LBS and 400 LBS. Such a filter may have in excess of 100 square feet of filter media.

Filters of this size may be adapted to conventional dust collection systems, such as for example, filtration systems for wood processing plants, sheetrock manufacturing plants, etc.

The filter media 524 can be similar to or formed using similar processes as the filter media described above and will preferably be a pleated media that has pleat panels that extend at least 85% of the width W2 and height H2 of the frame member 522. Again, the pleat panels will preferably include embossments described above to avoid undesirably blinding.

Again, the filters 504 are preferably reconditionable by having the filter media 524 replaced once spent. Filter media pack 525 can be replaceable and frame member 522 may be reusable. Further, as with the other embodiments described herein, the replaceable portion, such as filter media pack 525, may be fully incinerable.

Methods of managing filtration systems may utilize the filter systems identified above, which may form a part of a larger filtration management and supply system. Such methods can provide all functions and operations including filtration at a desired site, e.g. at a the location of a gas turbine, the manufacturing and reconditioning of the filters, monitoring of the filers to determine whether or not maintenance is provided, coordination of maintenance of filters; as well as filter performance and whether or not adjustments to filter media or design are needed.

FIG. 17 illustrates in simplified form a flow chart illustrating methods relating to filtration management utilizing the filtration systems outlined above.

At block 700, filtration occurs at a local site, such as for example, using any of the systems above to filter air.

The filtration system can include sensors to communicate data relating to the operation of the filter system, illustrated by arrow 702, to a central service center 704. One such piece of data may be that the filters are nearing an end of their serviceable life. Alternatively, the customer or someone on site may communicate to the central service center 704 that the filers need servicing.

The central service center 704 can dispatch a service truck 706 to the cite with replacement filters.

Upon arrival at the site, the service personnel can replace any spent filters as necessary. Again, as outlined above, embodiments of the filter systems can allow replacement of spent filters while continuing to allow air to be filtered without causing the downstream systems to go off line, such as by isolating filters individually such that they can be removed and replaced without permitting dirty fluid bypass, e.g. by using isolation units as described above.

Further, due to the size and configuration of the filters, the filters will be removed from the filter house modules using filter positioning units. In FIG. 17, the filter positioning unit takes the form of a fork lift truck that is transported by the service personnel with the replacement filters on the service truck 706. The filters will again not be manually manipulated, i.e. by hand, by the service personnel. Further, in some filter systems, the service personnel will not be required to enter into the filter house modules, such as by entering a clean air volume of the filter house module.

Prior to installation of the filters, any covers that protect the filter media may be removed, and particularly any covers that would not be accessible to the service personnel once the filter is installed in the filter house module.

Once the spent filter is removed, the covers may be placed on the spent filter and the spent filter may be placed back on the service truck. The order of attaching the covers and placing the spent filters on the service truck may vary depending on the configuration of the filters, the configuration of the filter house module, the configuration of the service truck, the configuration of the filter positioning unit, etc.

Placement of the covers provides several benefits including preventing filtered particulates from being exhausted from the filters as the filters are returned 710 to a reconditioning center. This prevents debris from being distributed on any distribution channels used while returning 710 the filters to the reconditioning center. Further, using the covers better maintains the filters in the condition they were in that caused the need for service. This allows for more accurate evaluation of the filters after a period of service so as to better analyze the performance of the filter. Finally, this also provides a convenient and safe way to transport the covers back to the re-build/reconditioning center for reuse. Finally, it provides an easy way to ensure that no covers have been inadvertently left at the site.

As noted above, part of the method may include returning 710 the filters to a reconditioning center. The reconditioning center and processes performed thereat are illustrated at block 712. It shall be noted that the reconditioning center could simply be and would typically be the place where new filters are manufactured as well.

The reconditioning center will, at a minimum, recondition the filters for further use. Typically, it is contemplated that when using the filters discussed above, the filter media will be removed from the frame members. The spent filter media will typically be disposed of by incineration. New filter media will be installed in the frame members. Further, new seal members, if provided by the filters, will be installed as well. With reference to the filter 104A of FIG. 9, the filter media packs 125 can be removed, inspected and then disposed of. Thereafter, new replacement filter media packs 125 can be installed and sealed within frame member 122. A new filter house interface 108 or parts thereof can be replaced. For example, any seal members of the filter house interface 108 may be replaced In more sophisticated systems, the filters may be analyzed at the reconditioning center.

For instance, the amount and type of impurities filtered out of the air flow may be analyzed. The weight of the spent filter may be analyzed to determine a weight amount of impurities removed.

The filter media may be analyzed to determine the type of loading that occurs on the filter media. The depth of particulate loading through the thickness of the filter media may be analyzed. The filter media can be analyzed to determine if the impurities (e.g. dust) are caking on the dirty side surface of the filter media causing the filter media to become spent prematurely without utilizing the desired depth of the filter media for filtration purposes. This analysis could also identify if unexpected moisture is present within or proximate the filter house module that is preventing maximum filtering capacity.

The filter media can be analyzed to determine if any damage has occurred to the filter media. Damage to the media could indicate that the sensors indicating when service is needed may require calibration. Damage to the media could indicate that a different type of media may be required for a particular operating environment due to temperature, precipitation, air flow patterns, airborne chemicals, etc. at the particular operating site.

Deformation of the frame member and filter media may illustrate that further support of the various components of the filter and particularly the filter media may be required.

Further, due to deposits on both the clean and dirty side of the filter media, air flow patterns through the filter and filter media may be evident to illustrate inefficient air flow patterns. For example, the air flow patterns may illustrate that some areas of the filter media are not receiving the same amount of air flow as other areas of the filter media. This information can be highly beneficial for analyzing the operation of the filters particularly for larger ones of the filters outlined above, such as ones that are formed from intermodal shipping containers. Further, if the mass air flow through the overall filter is sampled and the appropriate value is determined for a given filter, due to the potential size of the filters outlined herein if air flow is not uniform, one portion of the filter may be providing a much larger air flow than another portion that could result in premature failure.

The air flow patterns could also illustrate that obstructions may exist at the filtration site or that a different filter design may be need to be employed. This could also identify if the filter media is collapsing on itself blinding portions of the filter media reducing the capacity of the filter.

All of this information can be communicated 714 to the central service center 704.

The information gathered from the analysis of the filters can also be compared against other filters retrieved from a same site or different sites to determine whether maximum performance is occurring.

By providing the full range of services including more than simply manufacturing and delivery of the filters to a site, the service provider is allowed the benefit of obtaining the spent filters to perform the analysis outlined above. Further, by providing the filter systems above where the filters are more quickly and easily serviceable by a service provider using the filter positioning systems and not needing to shut down systems or provide access to the interior areas of the filter house modules, it more likely that the filters will be reconditioned rather than simply disposed of.

Depending on the particular arrangement, particular frame members and other reusable components may be earmarked to be reused for the same site. However, in other situations, reusable components may be sent to various different sites over their lifetime. Earmarking and tracking of the components and filters could be employed using barcode systems or RFID type tracking systems that help track the filters at the various locations. For instance, the filters could be scanned prior to leaving the manufacturing/reconditioning facility, scanned again when being installed at a particular site, scanned as they are being installed and/or removed from a filter house module, scanned again as they are delivered back to the reconditioning facility and again scanned as the filter and filter media thereof is being evaluated. All of this information can be relayed to the central service center.

Preferably, this information and data is communicated using internet of things (IoT) networks.

In some implementations, the core infrastructure for the filtration systems may simply be leased to the company operating the site where the actual filtration occurs. The core infrastructure including, some or more than depending on the implementation, the filter house modules, the filter positioning units, transportation equipment (e.g. tractor trailers), the reusable filter components would all be owned or controlled by the service provider who controls and manages the filtration process.

Various benefits are contemplated by using various ones of the filter systems outlined herein alone or in conjunction with a filtration management system discussed having some or more of the features outlined above. For example, some or all of the filter systems allow for quickly changing the filters with limited disturbance to downstream operations. Using the filtration management system and methods allows for hassle free operation by customers who use the filtration systems. The filtration could be provided as an annual cost providing known costs for customers. Customers would no longer be required to hold inventory for replacement filters. Customer media specific needs could be more easily tailored and determined based on the additional possible analytics. Filters providing increased life and reduced service intervals can be provided reducing undesirable downtime. Further, overall savings can be incurred due to more reliable reuse of filter components such as frame members and covers. Virtually no packaging waste or dunnage would be required to ship the filters nor would the filters need to be shipped in fully enclosed shipping equipment, e.g. enclosed trailers. Virtually nothing will go to landfills. Instead, the filter frames themselves in conjunction with reusable covers could and would provide protection from environmental conditions during shipping operations. Further yet, if filters are formed from standard sized and configured shipping containers, standard existing transportation methods and systems could easily be leveraged for cost efficient transportation throughout the world. The spent media can be incinerable, which is environmentally friendly. Further, as the filters, and particularly the frame members, provide protection to the filter media from surrounding environment conditions in use, the size and material required for the filter house modules is contemplated to be reduced.

In some embodiments, the filter management system may simply be based on predetermined replacement intervals. More particularly, rather than monitoring the status of the filters, the filter service provider and service personnel will replace the filters at a predetermined interval. Such a process can provide for easy cost estimation and known pricing for the customer. Due to the known number of service intervals per year, the cost for service can be easily budgeted.

All references, including publications, patent applications, and patents sited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of distributing a filter for use with a filter house module, the method comprising:

shipping a filter to a site having a filter house module, the filter comprising a frame and filter media secured to the frame, the frame being formed at least in part by a shipping container for shipping the filter;

mounting the filter to the filter house module with at least a portion of the shipping container remaining attached to the filter media and mounted to the filter house module;

determining that the filter needs to be replaced;

delivering a replacement filter with a trailer;

replacing the filter with the replacement filter;

wherein replacing the filter with the replacement filter uses a filter positioning unit such that the filter and replacement filter need not be manually handled by the service personnel;

wherein:
the filter house module defines a filter mounting interface;
the filter including a filter house interface that mates with the filter mounting interface;
transitioning the filter into a mounted position adjacent the filter house module with the filter house interface adjacent the filter mounting interface to attach the filter to the filter house module;

wherein:
the filter positioning unit is one of:
a mechanical lift that forms part of the trailer used to deliver the filter; or
a forklift that is truck-mountable to the trailer used for delivering the replacement filter; and
the step of mounting the filter includes raising the filter from an unmounted position to a mounted position to engage the filter with the filter mounting interface.

2. The method of claim 1, wherein the frame defines an air inlet upstream of the filter media and the filter house interface, the air inlet forming one of the sides of the shipping container.

3. The method of claim 2, further comprising:
covering, with a cover, the air inlet during shipment of the filter; and
moving the cover to expose the filter house for mounting the filter to the filter mounting interface.

4. The method of claim 1, wherein the filter weighs at least 50 lbs in a clean state.

5. The method of claim 1, wherein filter house module is a hub arrangement including a plurality of filter mounting interfaces fluidly communicating with a clean air volume;
further including a plurality of filters, each filter including a filter house interface that mates with a corresponding one of the filter mounting interfaces;
further including, transitioning, with the filter positioning unit, the filters into a corresponding mounting position with the corresponding filter house interface adjacent the corresponding filter mounting interface to attach the filters to the filter house module.

6. The method of claim 5, further comprising:
transitioning at least one isolation unit positioned downstream from at least one of the filter mounting interfaces between a blocking position in which the isolation unit prevents air flow through the corresponding filter mounting interface and an open position that allows for air flow through the corresponding filter mounting interface;
removing the filter mounted to the filter mounting interface with the isolation unit in the blocking position; and
permitting air to flow through at least one other filter mounting interface to continue to allow filtered air to flow through the filter house module.

7. The method of claim 1, wherein the filter mounting interface and filter house interface have first and second lateral dimensions that are perpendicular to one another as well as perpendicular to the flow of air through the filter mounting interface and filter house interface, each of the first and second lateral dimensions being at least 5 feet.

8. The method of claim 1, wherein the shipping container generally defines a first pair of spaced apart and parallel rectangular sides with each side having dimensions of at least five feet by five feet; a second pair of spaced apart and parallel rectangular sides with each side having dimensions of at least five feet by 15 feet, the second pair of spaced apart and parallel rectangular sides extending perpendicularly between the first pair of spaced apart and parallel rectangular sides; a third pair of spaced apart and parallel rectangular sides with each side having dimensions of at least five feet by 15 feet, the third pair of spaced apart and parallel rectangular sides extending perpendicularly between the first pair of spaced apart and parallel rectangular sides and extending perpendicularly between the second pair of spaced apart and parallel rectangular sides.

9. The method of claim 1, wherein the filter media has at least 800 square feet of filter media.

10. The method of claim 9, further comprising maintaining filter media in a constant position relative to the frame defined by the shipping container during shipping as well as after the filter is mounted to the filter house module and is in use.

11. The method of claim 1, wherein the filter house module defines a clean air volume downstream of the filter mounting interface, the clean air volume having a depth that is generally parallel to a flow of clean air through the filter mounting interface, the filter having a dimension parallel to the depth of the clean air volume when mounted to the filter house module, the dimension of the filter being less than the depth of the clean air volume.

12. The method of claim 1, wherein the filter house module is formed as an intermodal shipping container.

13. The method of claim 1, further comprising:
removing the filter from the filter house module;
shipping, at least the frame, to a reconditioning facility;
removing spent filter media from the frame;
replacing the filter media with new filter media to form a refurbished filter; and
using the refurbished filter as the replacement filter to filter air.

14. The method of claim 13, further comprising:
monitoring the filter while in use in the filter house module;
communicating the need to replace the filter to service personnel;
dispatching service personnel with the replacement filter.

15. The method of claim 13, analyzing the filter at the reconditioning facility.

16. The method of claim 15, wherein the step of communicating the need to replace the filter sends information to a central service center; wherein the central service center dispatches the service personnel with the replacement filter.

17. The method of claim 1, further comprising:
monitoring the filter while in use in the filter house module;
communicating the need to replace the filter to service personnel;
dispatching service personnel the replacement filter.

18. The method of claim 17, wherein the filter house module has a plurality of filters mounted thereto;
> further comprising isolating the filter being replaced such that no air passes through the filter being replaced but continuing to allow air to pass through at least one of the other filters such that the filter house module still has clean air passing therethrough while the filter is being replaced.

19. The method of claim 1, wherein the filter has a width of at least three feet, a height of at least three feet and a length of at least three feet and has a weight of 150 kg.

20. The method of claim 1, wherein the shipping container is an intermodal shipping container.

21. The method of clam 1, wherein the replacement filter is a refurbished filter that had been previously in service;
> further comprising forming the replacement filter including refurbishing a previously used filter to form the replacement filter
>
> wherein the step of refurbishing includes reusing a frame member of the previously used filter and installing new filter media within the reused frame member.

* * * * *